US008315310B2

(12) United States Patent
Shi et al.

(10) Patent No.: US 8,315,310 B2
(45) Date of Patent: Nov. 20, 2012

(54) METHOD AND DEVICE FOR MOTION VECTOR PREDICTION IN VIDEO TRANSCODING USING FULL RESOLUTION RESIDUALS

(75) Inventors: Xun Shi, Toronto (CA); Xiang Yu, Kitchener (CA); Dake He, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 335 days.

(21) Appl. No.: 12/684,219

(22) Filed: Jan. 8, 2010

(65) Prior Publication Data

US 2011/0170595 A1 Jul. 14, 2011

(51) Int. Cl.
*H04B 1/66* (2006.01)
*H04N 5/14* (2006.01)
(52) U.S. Cl. .................................. 375/240.16; 348/699
(58) Field of Classification Search .................. 348/699, 348/424.1; 375/240.01–240.26; 382/248, 382/233, 236, 238
See application file for complete search history.

(56) References Cited

U.S. PATENT DOCUMENTS

| | | | |
|---|---|---|---|
| 5,646,686 A | 7/1997 | Pearlstein | |
| 6,084,908 A | 7/2000 | Chiang et al. | |
| 6,510,177 B1 | 1/2003 | De Bonet | |
| 6,728,317 B1 * | 4/2004 | Demos | 375/240.21 |
| 7,526,027 B2 | 4/2009 | Sekiguchi | |
| 2002/0181579 A1 | 12/2002 | Vetro et al. | |
| 2003/0016751 A1 | 1/2003 | Vetro et al. | |
| 2003/0072374 A1 | 4/2003 | Sohm | |
| 2004/0202250 A1 | 10/2004 | Kong et al. | |
| 2005/0041740 A1 | 2/2005 | Sekiguchi | |
| 2005/0069210 A1 * | 3/2005 | Tardif | 382/233 |
| 2005/0175099 A1 | 8/2005 | Sarkijarvi et al. | |
| 2006/0251330 A1 | 11/2006 | Toth et al. | |
| 2007/0029507 A1 | 2/2007 | Karel Steenbrink et al. | |
| 2007/0058713 A1 | 3/2007 | Shen et al. | |
| 2007/0133683 A1 | 6/2007 | Ohgose | |
| 2007/0171970 A1 | 7/2007 | Song | |
| 2007/0217506 A1 | 9/2007 | Yang | |
| 2008/0013627 A1 | 1/2008 | Tahara et al. | |
| 2008/0056354 A1 | 3/2008 | Sun et al. | |
| 2008/0137741 A1 | 6/2008 | Kalva | |
| 2008/0212682 A1 | 9/2008 | Kalva | |
| 2008/0253457 A1 | 10/2008 | Moore | |
| 2008/0267294 A1 | 10/2008 | Fernandes | |
| 2008/0310513 A1 | 12/2008 | Ma et al. | |
| 2009/0097560 A1 | 4/2009 | Robertson | |
| 2009/0103622 A1 | 4/2009 | Tripathi et al. | |
| 2009/0226102 A1 | 9/2009 | Huang | |

(Continued)

OTHER PUBLICATIONS

I. Ahmad, Xiaohui Wei, Yu Sun, and Ya-Qin Zhang. Video transcoding: an overview of various techniques and research issues. Multimedia, IEEE Transactions on, 7(5):793-804, 2005.

(Continued)

*Primary Examiner* — Behrooz Senfi
(74) *Attorney, Agent, or Firm* — Rowand Intellectual Property Law

(57) ABSTRACT

A transcoder and methods of encoding inter-prediction frames of a downsampled video wherein the downsampled video is a spatially downsampled version of a full-resolution video. Full-resolution motion vectors are downscaled and a weighting factor is calculated for each downscaled motion vector based upon the transform domain residual coefficients associated with that full-resolution motion vector. A motion vector prediction is made based on the weighted average using the downscaled motion vectors and their weighting factors.

18 Claims, 18 Drawing Sheets

U.S. PATENT DOCUMENTS

| | | |
|---|---|---|
| 2010/0158126 A1 | 6/2010 | Bai |
| 2011/0002554 A1 | 1/2011 | Uslubas et al. |
| 2011/0050991 A1 | 3/2011 | Bellers et al. |
| 2011/0122950 A1 | 5/2011 | Ji |
| 2011/0170595 A1 | 7/2011 | Shi |
| 2011/0292999 A1 | 12/2011 | Jeong |

OTHER PUBLICATIONS

N. Bjork and C. Christopoulos, Transcoder architecture for video coding, Consumer Electron, IEEE Trans on, vol. 44, pp. 88-98, Feb. 1998.

I. Sylvester, Transcoding: The Future of the Video Market Depends on It, IDC Executive Brief Nov. 2006.

A. Vetro, C. Christopoulos, and H. Sun. Video transcoding architectures and techniques: an overview. Signal Processing Magazine, IEEE, 20(2): 18-29, 2003.

D. Marpe, T. Wiegand, and G J. Sullivan. Standards report—the h.264/mpeg4 advanced video coding standard and its applications. Communications Magazine, IEEE, 44(8): 134-143, 2006.

T. Wiegand, G. J. Sullivan, G. Bjntegaard, and A. Luthra. Overview of the h.264/avc video coding standard. Circuits and Systems for Video Technology, IEEE Transactions on, 13(7):560-576, 2003.

J. De Cock, S. Notebaert, K. Vermeirsch, P. Lambert and R. Van de Walle, Efficient spatial resolution reduction transcoding for H.264/AVC, ICIP 2008, pp. 1208-1211.

H. Shen, X. Sun, F. Wu, H. Li, and S. Li, A fast downsizing video transcoder for h.264/avc with rate-distortion optimal mode decision, ICME 2006, pp. 2017-2020.

H. Shen, X. Sun and F. Wu. Fast h.264/mpeg-4 ave transcoding power-spectrum-based rate-distortion optimization. Circuits and Systems for Video Technology, IEEE Transactions on., vol. 18, No. 6, pp. 746-755, 2008.

J. Wang, An efficient motion estimation method for h.264-based video transcoding with arbitrary spatial resolution conversion, Master's thesis. University of Waterloo, Canada, 2007.

P. Yin, A. Vetro, B. Liu, and H. Sun, Drift compensation for reduced spatial resolution transcoding: a summary, IEEE Trans. Circuits and Systems, vol. 4, No. 2, pp. 32-3 6, 2004.

P. Zhang, Y. Lu, Q. Huang and W. Gao, Mode mapping method for H.264/AVC spatial downscaling transcoding, ICIP 2004, pp. 2781-2784.

Steiger, O., "Adaptive Video Delivery Using Semantics", Thesis No. 3236 (2005), École Polytechnique Fédérale De Lausanne.

ITU-T-Rec. H.264 AVC, Nov. 2007.

Samet, H., "Data Structures for Quadtree Approximation and Compression", Sep. 1985, Communications of the ACM, v.28, n.9.

Test Model Editing Committee: "Test Model 5", Coded Representation of Picture and Audio Information (ISO/IEC JTC1/SC29A/VG1 1 and ITU-T SG15 Q2), No. AVC-491b, N0400, Mar. 27, 1993, XP030000486.

European Search Report, EP Application No. 10150318.3-1247, Aug. 5, 2010; 8 pgs.

Bo Shen et al: "Adaptive Motion-Vector Resampling for Compressed Video Downscaling" IEEE Transactions on Circuits and Systems for Video Technology, vol. 9, No. 6, Sep. 1, 1999, XP011014612.

Siu W C et al: "On the architecture of H.264 to H.264 homogeneous transcoding platform" International Conference on Neural Networks and Signal Processing, Jun. 7, 2008, pp. 654-659, XP031298782.

Dogan S et al: "Chapter 6: Video Transcoding for Inter-network Communications" Apr. 25, 2002, Compressed Video Communications, John Wiley & Sons Ltd. pp. 215-256, XP007913926.

Wong J W C et al: "Predictive motion estimation for reduced-resolution video from high-resolution compressed video" Proceedings of the International Conference on Image Processing (ICIP), vol. 2, Oct. 4, 1998, pp. 461-464, XP010308639.

European Search Report, EP Application No. 10150319.1-1247, Aug. 5, 2010, 6 pgs.

European Search Report, EP Application No. 10150321.7-1247, Aug. 5, 2010, 7 pgs.

Huifeng Shen et al: "A Fast Downsizing Video Transcoder for H.264/AVC with Rate-Distortion Optimal Mode Decision" IEEE International Conference on Multimedia and Expo, Jul. 1, 2006, pp. 2017-2020, XP031033261.

Jia-Jun Bu et al: "Fast mode decision algorithm for spatial resolutions down-scaling transcoding to H.264" Journal of Zhejiang University—Science A, vol. 7, No. 1, Apr. 27, 2006, pp. 70-75, XP019385075.

European Search Report, EP Application No. 10150328.2-1247, Aug. 5, 2010, 7 pgs.

Jan De Cock et al: "Dyadic spatial resolution reduction transcoding for H. 264/AVC" Multimedia Systems, Springer, Berlin, DE, vol. 16, No. 2, Jan. 7, 2010, pp. 139-149, XP0198804325.

En-Hui Yang et al: "Rate Distortion Optimization for H. 264 Interframe Coding: A General Framework and Algorithms" IEEE Transactions on Image Processing, IEEE Service Center, Piscataway, NJ, US LNKD-DOI:10.1109/TIP.2007, 896685, vol. 16, No. 7, Jul. 1, 2007, pp. 1774-1784, XP011185448.

Christopoulos C et al: Video transcoding architectures and techniques: an overview IEEE Signal Processing Magazine, IEEE Service Center, Piscataway, NJ, US LNKD-DOI:10, 1109/MSP, 2003, 1184336, vol. 20, No. 2, Mar. 1, 2003, pp. 18-29, XP011095789.

European Search Report, EP Application No. 10150329.0-1247, Aug. 5, 2010, 7 pgs.

Ligang Lu et al: "Adaptive frame prediction for foveation scalable video coding" Proceedings of the International Conference on Multimedia and Expo (ICME), Aug. 22, 2001, pp. 705-708, XP010661935.

Sullivan G J et al: "Rate-Distortion Optimization for Video Compression" IEEE Signal Processing Magazine, IEEE Service Center, Piscataway, NJ, US LNKD-DOI:10.1109/79.733497, vol. 15, No. 6, Nov. 1, 1998, pp. 74-90, XP011089821.

USPTO US Office Action, relating to U.S. Appl. No. 12/684,374 dated Aug. 6, 2012.

USPTO Office Action relating to U.S. Appl. No. 12/684,298 dated Aug. 9, 2012.

* cited by examiner

US 8,315,310 B2

METHOD AND DEVICE FOR MOTION VECTOR PREDICTION IN VIDEO TRANSCODING USING FULL RESOLUTION RESIDUALS

FIELD

The present application generally relates to video transcoding for spatial down-sampling and, in particular, to motion vector prediction in the context of spatial down-sampling.

BACKGROUND

The current state-of-the-art for video encoding is the ITU-T H.264/AVC video coding standard. It defines a number of different profiles for different applications, including the Main profile, Baseline profile and others.

There are a number of standards for encoding/decoding images and videos, including H.264/AVC, that use block-based coding processes. In these processes, the image or frame is divided into blocks, typically 4×4 or 8×8, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction).

In many cases, a video encoded at a certain resolution may need to be "spatially downsampled", meaning reduced in size to a smaller resolution. This may be needed if the video is to be played back on a smaller video screen. In many cases, rather than provide a playback device with a full-resolution encoded video and have the playback device decode and downsample the video, it is advantageous to perform the downsampling before transmitting the encoded video to the playback device. Even in the absence of transmission cost concerns, it may be too time consuming or taxing upon the processing resources of an end device to have the end device receive, decode and downsample a full-resolution video as opposed to receiving and decoding a downsampled encoded video. Accordingly, transcoders are used to convert encoded full-resolution video into encoded downsampled video.

A problem that arises with transcoders is that they are costly in terms of processing power and time delay because they often employ the complicated rate-distortion optimization associated with encoding in many modern video encoding standards. An advantage of a transcoder, however, is that the transcoder has information available from the decoding of the full-resolution video that might be exploited to improve the speed or quality of the encoding process for the downsampled video.

It would be advantageous to provide for an improved transcoder and methods or processes for transcoding that exploit data from the decoding of a full-resolution video.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
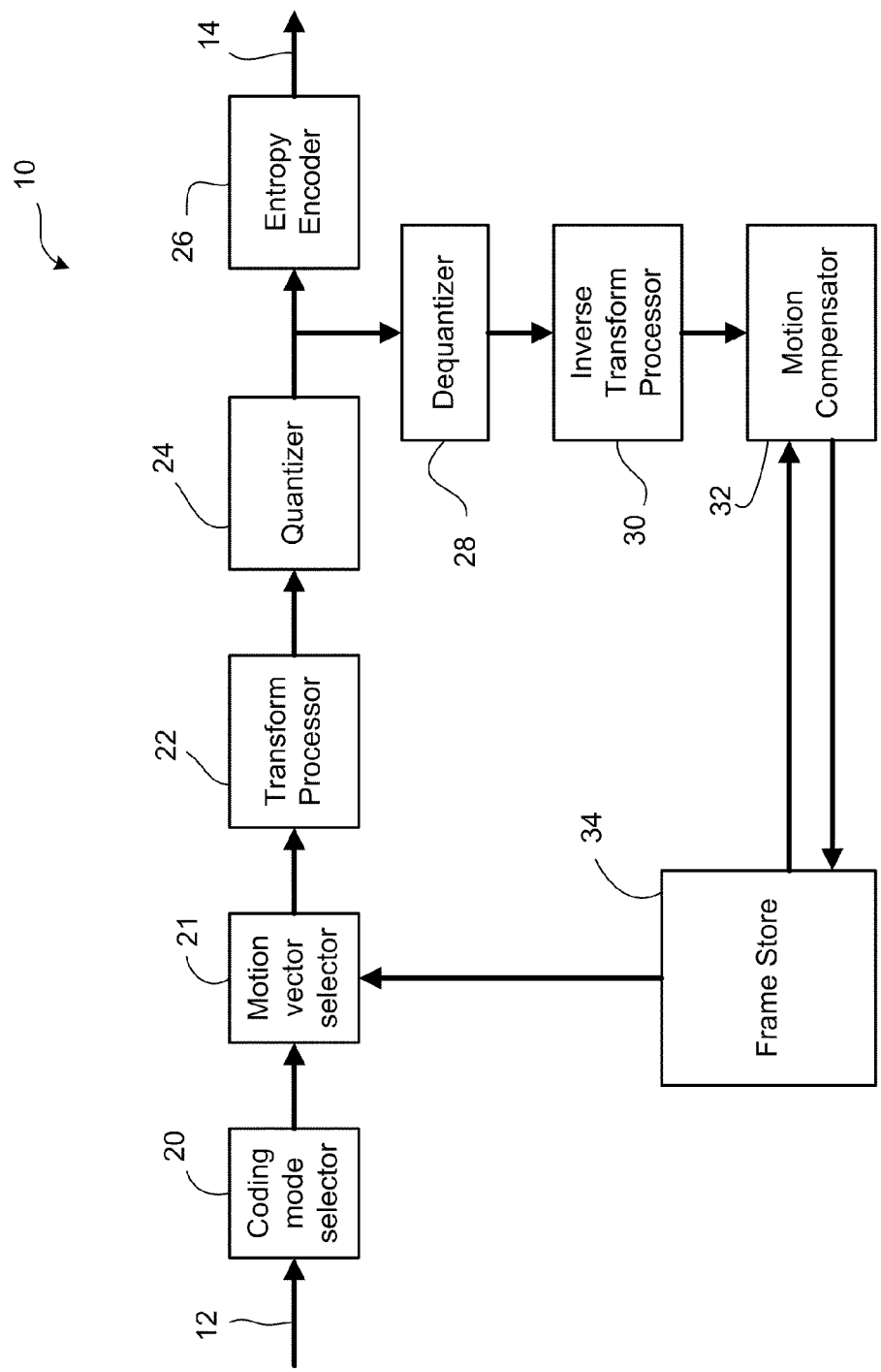
FIG. 1 shows, in block diagram form, an encoder for encoding video.

In one aspect, the present application discloses a method of encoding a downsampled video. The downsampled video is a spatially downsampled version of a full-resolution video. The downsampled video includes a frame having a macroblock partitioned into at least one partition, one partition of the at least one partition corresponding to at least two full-resolution partitions in a corresponding frame of the full-resolution video, each of the at least two full-resolution partitions having an associated full-resolution motion vector relative to a reference frame. The method includes downscaling the associated full-resolution motion vectors; calculating a weighting factor for each of the downscaled full-resolution motion vectors, wherein each weighting factor is based upon transform domain residual coefficients associated with that full-resolution motion vector; determining a motion vector prediction as the average of the product of each of the downscaled full-resolution motion vectors with its respective weighting factor; selecting a desired motion vector for the one of the partitions from a search area within the reference frame, the search area being centered at a point indicated by the motion vector prediction; and encoding the downsampled video to generate an encoded downsampled video, including the desired motion vector for the one partition.

Other aspects and features of the present application will be understood by those of ordinary skill in the art from a review of the following description of examples in conjunction with the accompanying figures.

In the description that follows, example embodiments are described with reference to the H.264/AVC standard. Those ordinarily skilled in the art will understand that the present application is not limited to H.264/AVC but may be applicable to other video coding/decoding standards.

In the description that follows, the terms frame and slice are used somewhat interchangeably. Those of skill in the art will appreciate that, in the case of the H.264/AVC standard, a frame may contain one or more slices. It will also be appreciated that certain encoding/decoding operations are performed on a frame-by-frame basis and some are performed on a slice-by-slice basis, depending on the particular requirements of the applicable video coding standard. In any particular embodiment, the applicable video coding standard may determine whether the operations described below are performed in connection with frames and/or slices, as the case may be. Accordingly, those ordinarily skilled in the art will understand, in light of the present disclosure, whether particular operations or processes described herein and particular references to frames, slices, or both for a given embodiment.

In the description that follows, example transcoders and methods and process implemented within those transcoders are discussed and described. The example transcoders are configured to perform spatial downsampling and, for simplicity, the discussion below is based on a 2:1 dyadic downsampling ratio. Those skilled in the art will appreciate that other downsampling ratios are possible and that the present application is not limited to any particular downsampling ratio.

Figure 2:
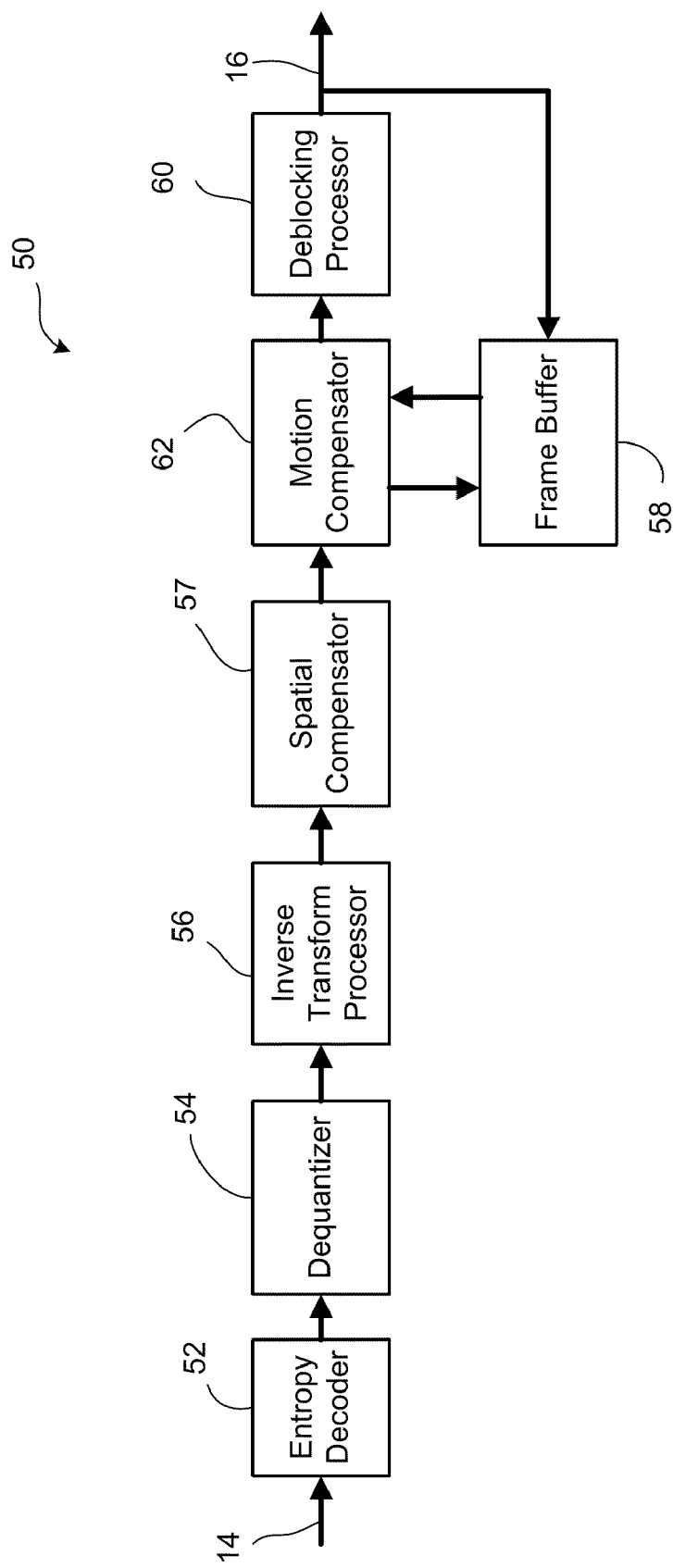
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular macroblocks within the frame/slice are inter or intra coded. The transform processor 22 performs a transform upon the spatial domain data. For example, in many embodiments a discrete cosine transform (DCT) is used. The transform is performed on a macroblock or sub-block basis, depending on the size of the macroblocks. In the H.264/AVC standard; for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes.

The resulting coefficient matrix for each block is quantized by the quantizer 24. The quantized coefficients and associated information are then encoded by the entropy encoder 26.

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction algorithm, the source data of the block may be converted to residual data. The transform processor 22 then encodes the residual data. H.264/AVC, for example, prescribes nine spatial prediction modes for 4×4 transform blocks. In some embodiments, each of the nine modes may be used to independently process a block, and then rate-distortion optimization is used to select the best mode.

The H.264/AVC standard also prescribes the use of motion prediction/compensation to take advantage of temporal prediction. Accordingly, the encoder 10 has a feedback loop that includes a de-quantizer 28, inverse transform processor 30, and deblocking processor 32. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. A motion predictor 36 uses the frames/slices stored in the frame store 34 as source frames/slices for comparison to a current frame for the purpose of identifying similar blocks. Accordingly, for macroblocks to which motion prediction is applied, the "source data" which the transform processor 22 encodes is the residual data that comes out of the motion prediction process. For example, it may include information regarding the reference frame, a spatial displacement or "motion vector", and residual pixel data that represents the differences (if any) between the reference block and the current block. Information regarding the reference frame and/or motion vector may not be processed by the transform processor 22 and/or quantizer 24, but instead may be supplied to the entropy encoder 26 for encoding as part of the bitstream along with the quantized coefficients.

Those ordinarily skilled in the art will appreciate the details and possible variations for implementing H.264/AVC encoders.

The decoder 50 includes an entropy decoder 52, dequantizer 54, inverse transform processor 56, spatial compensator 57, and deblocking processor 60. A frame buffer 58 supplies reconstructed frames for use by a motion compensator 62 in applying motion compensation. The spatial compensator 57 represents the operation of recovering the video data for a particular intra-coded block from a previously decoded block.

The bitstream 14 is received and decoded by the entropy decoder 52 to recover the quantized coefficients. Side information may also be recovered during the entropy decoding process, some of which may be supplied to the motion compensation loop for using in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate the "video data". It will be appreciated that, in some cases, such as with an intra-coded macroblock, the recreated "video data" is the residual data for use in spatial compensation relative to a previously decoded block within the frame. The spatial compensator 57 generates the video data from the residual data and pixel data from a previously decoded block. In other cases, such as inter-coded macroblocks, the recreated "video data" from the inverse transform processor 56 is the residual data for use in motion compensation relative to a reference block from a different frame.

The motion compensator 62 locates a reference block within the frame buffer 58 specified for a particular inter-coded macroblock. It does so based on the reference frame information and motion vector specified for the inter-coded macroblock. It then supplies the reference block pixel data for combination with the residual data to arrive at the recreated video data for that macroblock.

A deblocking process may then be applied to a reconstructed frame/slice, as indicated by the deblocking processor 60. After deblocking, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

In many instances it is necessary to transcode an encoded video. For example, transcoding may be used to convert an encoded video stream from one encoding format (such as H.264/AVC) to another encoding format (such as MPEG2). In another example, transcoding may be used to reduce the frame size of a video—i.e. to spatially downsample the video—in order to have the video playback on a smaller video screen. This can be particularly relevant with modern technology where, for example, videos may be viewed on a mobile device screen, which tends to be relatively small, or videos may be viewed through a relatively small video playback plug-in within a web browser. In many other situations, videos that are originally encoded at a particular frame size may need to be spatially downsampled to create an encoded version of the video at a smaller frame size before being transmitted to an end user for playback. In these situations it may be too costly send the full-resolution encoded video to the end device for downsampling after decoding. Even in the absence of cost concerns, it may be too time consuming or taxing upon the processing resources of an end device to have the end device receive, decode and downsample a full-resolution video as opposed to receiving and decoding a downsampled encoded video. Hence, the importance of transcoding.

Figure 3:
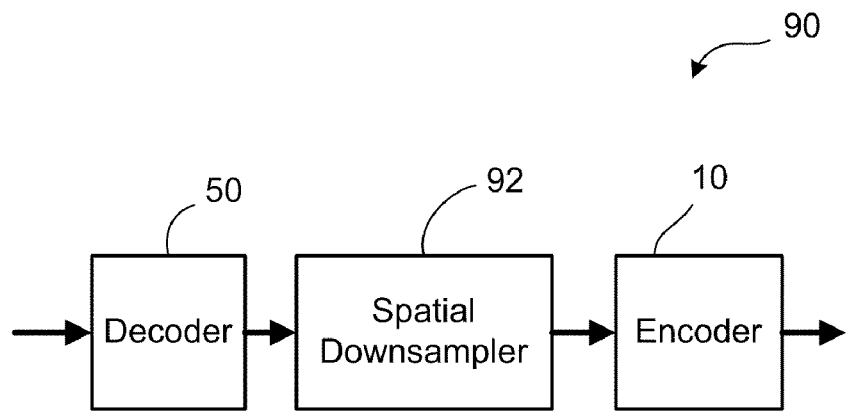
FIG. 3 shows a block diagram of an example transcoder.

Reference is now made to FIG. 3, which shows a block diagram of an example transcoder 90. In this simplified example, the transcoder 90 includes the conventional video decoder 50 for the full-resolution video to produce a full-resolution pixel domain video output, a spatial downsampler 92 for downsampling the uncompressed full-resolution video to the desired size, and the conventional encoder 10 for encoding the downsampled video to output an encoded downsampled bitstream. This cascaded architecture exhibits high quality coding performance since it performs a full decoding and full encoding using the standard rate-distortion analysis to achieve high quality encoding performance. Accordingly, this architecture is often referred to as the "Benchmark system" for transcoding. However, it will be appreciated that this model is inefficient in that the encoding process was not designed specifically for transcoding scenarios. The full conventional encoding process includes complicated rate-distortion analysis to select the appropriate coding mode and motion vectors.

Figure 4:
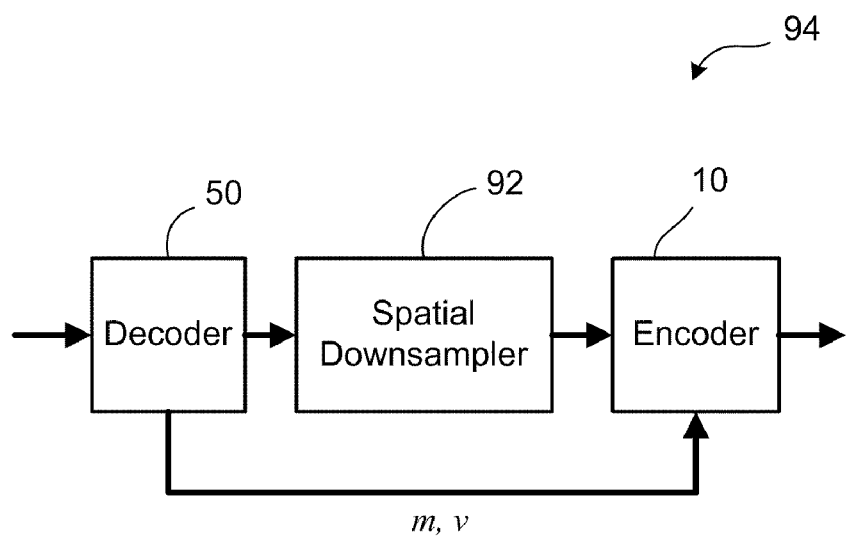
FIG. 4 shows a block diagram of another example transcoder.

Reference is now made to FIG. 4, which illustrates another example transcoder 94. In this example, the transcoder 94 differs from the Benchmark system transcoder 90 in that the encoder 10 receives full-resolution information 96 to assist in reducing the computational complexity of the encoding process. The full-resolution information 96 in particular includes full-resolution macroblock coding mode M information and full-resolution motion vector V information. In some known systems, the encoder 10 uses the full-resolution motion vector information and macroblock coding mode information to speed up the encoding process for the downsampled video by downsampling the motion vectors and mapping the coding modes to the downsampled video. This architecture can result in improved speed over the Benchmark system, but suffers from drift problems.

The transcoding methods and systems described below include a number of modifications that improve transcoding performance. In particular, many of the methods and systems below exploit the availability of the full-resolution residual transform coefficients (TCOEFs) to improve the encoding performance within a transcoder. Before detailing specific examples, the rate-distortion cost function and its role in H.264/AVC is described.

R-D Cost Optimization in the Encoding Process

To simplify the discussion, uppercase letters and lowercase letters are introduced to distinguish full-resolution data and downsampled target resolution data, respectively. A compressed inter-predicted macroblock in H.264/AVC is decoded into a set of five components (M, Ref, V, U and Q). M is the macroblock mode; also interchangeably called the coding mode or the partition mode. The luminance component of a macroblock can be partitioned into one of the following 7 modes with different partition sizes: 16×16, 8×16, 16×8, 8×8 and sub-partition modes 4×8, 8×4, 4×4. Ref is a vector containing the indices of reference frames, which are previously coded frames used as predictions to each partition. For the purposes of the discussion herein, the number of reference frames is assumed to be 1. In other words, the following discussion presumes motion estimation only on the most recent coded frame; however, it will be appreciated that the more general case may involve multiple frames. V are motion vectors, which are two-dimensional vectors storing the spatial offsets for each partition to its prediction in the reference frames. U refers to motion prediction residuals and Q is the scalar quantization parameter.

In order to achieve the optimal coding performance, a conventional encoder handles each inter-predicted macroblock with a brute-force time-consuming process. Two computationally expensive operations are involved: considering all candidate motion vectors within a certain range (motion estimation) and considering all possible macroblock modes (coding mode). Coding performance is measured by a rate-distortion (r-d) cost function, which takes the form:

$$J = D + \lambda R \quad (1)$$

where distortion D refers to coding errors, and coding rate R is the number of bits spent to represent the coded macroblock. The quantity $\lambda$ is the Lagrangian multiplier, which is a function of the quantization parameter QP.

In the H.264/AVC reference codec, the cost function is carried out in motion estimation and mode decision based on somewhat different quantities. Motion estimation aims at searching for motion vectors that lead to the minimum rate-distortion cost. This process is separately performed for each partition of a macroblock in frame i based on the minimization of:

$$J_{me\_min} = \min_{v_i}\|x_i - p_i(m_i, v_i, \overline{x_{i-1}})\| + \lambda r_{v_i} \quad (2)$$

over a certain search range. Distortion, in this equation, is the sum of differences between original pixels $x_i$ and their predictions $p_i$. The predictions $p_i$ are found based upon the reference frame $\overline{x_{i-1}}$, the specific block of the reference frame pointed at by motion vector $v_i$, and at the specified macroblock mode $m_i$. The rate term, $r_{v_i}$ represents the rate, that is the number of bits in the output bitstream required to encode the motion vectors $v_i$.

It will be noted that Equation (2) does not reflect the real distortion and real coding rate. In fact, the real distortion comes from the integer rounding from quantization of the transform domain coefficients (TCOEFs) (also called the "residuals"), and the real coding rate includes both motion rate and texture rate. Those skilled in the art will appreciate that the cost function used in motion estimation is incomplete because residuals are undetermined at this stage. In order for the real rate-distortion cost to be evaluated at the motion estimation stage, it would require that the encoder calculate for each candidate motion vector the residuals, transform and quantize the predicted residuals, and then reconstruct the macroblock, after which the real cost can be measured. Such an implementation is impractical due to the high computational complexity. Therefore, the conventional encoder uses Equation (2) to approximate the real rate-distortion expenses when performing motion vector estimation.

During mode decision, since the residuals are more readily available, the rate-distortion cost function is capable of taking them into account. Accordingly, macroblock mode may be selected based on the minimization of:

$$J_{md\_min} = \min_{m_i}\|x_i - \overline{x_i}\| + \lambda r_{m_i, v_i, z_i} \quad (3)$$

$$= \min_{m_i}\|x_i - (p_i(m_i, v_i, \overline{x_{i-1}}) + z^{-1}z(u_i, q_i))\| + \lambda r_{m_i, v_i, z_i}$$

over all possible inter-coded macroblock modes. Equation (3) reflects the real distortion measurement, which is the accumulated difference between original pixels $x_i$ and their reconstructions $\overline{x_i}$ over the whole macroblock. Reconstruction $\overline{x_i}$ is generated based on the macroblock prediction $p_i$ found in the reference frame as adjusted or modified by the reconstructed motion estimation residuals $z^{-1}z(u_i, q_i)$, where $u_i$ represents the residuals, $q_i$ is the quantization step size, z is the transform and quantization process, and $z^{-1}$ is the inverse process of z. Rate cost in this case also represents the real coding bits, which includes not only the motion rate $r_{m,v}$ but also the texture rate $r_z$. The "texture rate" is a term sometimes used to refer to the rate for encoding the quantized transform domain coefficients (TCOEFs).

It will be appreciated that the encoding process employs the above two cost functions at different stages. Equation (2) is first used to approximate the best motion vectors for a specific macroblock mode and Equation (3) is used later in the encoding process to select the optimal macroblock mode. It is easy to infer that if Equation (2) inaccurately locates a suitable motion vector, Equation (3) will be misled in selecting an optimal macroblock mode and this sub-optimal result will eventually impact overall coding performance.

In accordance with one aspect of the present application, it is noted that if the cost function for motion estimation can be compensated with accurate residual prediction, the overall encoding performance will be consistently improved. Advantageously, in the context of transcoding, accurate residual prediction information for a full-resolution video is available as a basis for estimating the residuals for a downsampled video. Accordingly, it may be possible to exploit the residual data received in full-resolution form to improve the motion estimation speed and/or accuracy when encoding a downsampled version of the video.

Modified Motion Estimation for Transcoding

In a spatial reduction transcoding scenario, a potentially helpful piece of available information is the full-resolution TCOEFs. The TCOEFs may be downsampled and used as a prediction of co-located target TCOEFs. On this basis the cost function shown above as Equation (2) for motion estimation may be modified as follows:

$$J'_{me\_min} = \min_{v_i}\|DS(X_i) - \overline{x_i}'\| + \lambda r_{v,z} \quad (4)$$

$$= \min_{v_i}\|x_i - (p_i(m_i, v_i, \overline{x_{i-1}}) + z^{-1}z(DS(U_i), q_i))\| + \lambda r_{v,z}$$

The operator DS( ) is intended to indicate downsampling. Equation (4) reflects motion estimation cost evaluation taking into account fixed TCOEFs. It will be noted that the distortion expression is now based on the difference between the downsampled reconstructed "original" $DS(X_i)$, which for the purposes of encoding is original pixels $x_i$, and a modified reconstruction term $\overline{x_i}'$. The modified reconstruction term $\overline{x_i}'$ is similar to the reconstruction term found in the mode decision Equation (3), but the residuals term is not the actual residuals that would necessarily result from motion vector $v_i$, but rather this residuals term is based upon a downsampled set of the full-resolution transform domain residuals $DS(U_i)$ from the full-resolution residuals (TCOEFs). In some embodiments, if Equation (4) can refine the target motion vectors to yield a low rate-distortion cost, the downsampled TCOEFs prediction $DS(U_i)$ can be directly reused as target TCOEFs in the output bitstream. This residual generating method is different from Equation (3), in which the target residuals are actually determined by the pixel differences between original frame and motion prediction frame by motion vector both in the pixel domain.

It will be understood from considering the present description that the residuals term $DS(U_i)$ is "fixed" in the sense that it does not change during a search for a desired motion vector $v_i$ within a given search area when performing motion estimation for a particular partition. In this regard, the residuals term is a "prediction" of the residuals based on the downsampled full-resolution residuals, and Equation (4) may lead to the selection of a motion vector $v_i$ that results in a best fit with the predicted residuals. That is, each candidate motion vector $v_i$ points to a particular reference block of pixels in the reference frame. The distortion term in Equation (4) evaluates how well the original partition pixels $x_i$ match with the reconstruction that will be obtained by a decoder, where the reconstruction is the reference block as adjusted by the predicted residuals (after they have undergone transform and quantization z, and the inverse operation $z^{-1}$). Accordingly, it will be appreciated that the minimum distortion will result when a motion vector $v_i$ points to a reference block that combines with the reconstructed residuals prediction (after quantization, etc.) so as to result in a best match to the original partition pixels. In other words, by using the fixed predicted residuals, the motion vector $v_i$ will be selected based on best fit with the predicted residuals. In some cases, as explained below, this may not result in an optimal motion vector selection where the downsampled predicted residuals are a poor prediction.

The downsampling operation to obtain the downsampled residuals $DS(U_i)$ can be processed in the pixel domain, the same as downsampling a decoded full-resolution frame. On the other hand, since the full-resolution TCOEFs are available in DCT domain, in some embodiments a DCT-domain downsampling procedure may be more efficient. In addition, in order to find the best matching motion vectors, it may be advantageous for the two separate downsampling operations in Equation (4) to have the same downsampling properties, such as downsampling method, ratio and phase shift. In one example embodiment, a 13-taps downsampling filter is used for the downsampling operation.

Although a matching can be localized during motion estimation, Equation (4) cannot necessarily guarantee such a matching is the optimized solution compared with the conventional motion estimation process. If the matching leads to a significant rate-distortion performance drop, it may be indicative of a non-optimal local minimum. Accordingly, in some embodiments it may be advantageous to use a threshold evaluation on the results of the rate-distortion evaluation to determine whether Equation (4) has resulted in a failed prediction and, if so, conventional motion estimation using Equation (2) may be used to search for an alternative motion vector. Target residual TCOEFs will be generated accordingly.

Transcoder Architecture

Figure 5:
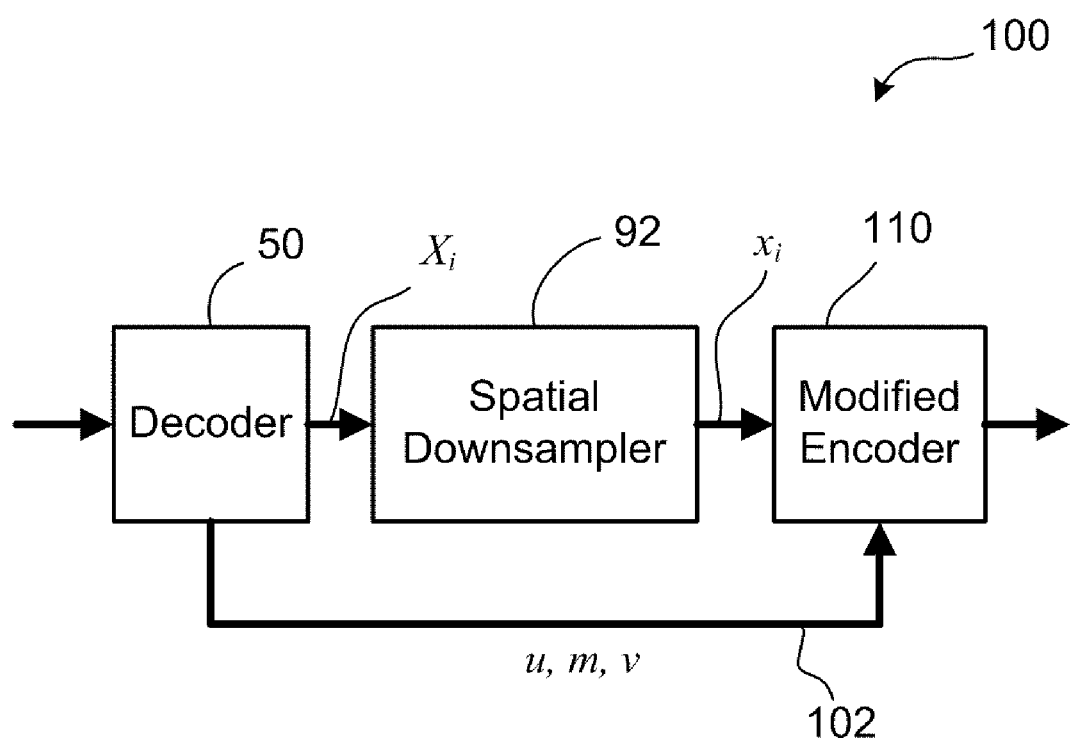
FIG. 5 shows a block diagram of a further example transcoder.

Reference is now made to FIG. 5, which shows, in block diagram form, an example transcoder 100 in accordance with the present application. The example transcoder 100 includes the decoder 50 and spatial downsampler 92. The decoder 50 outputs the decoded full-resolution spatial domain video $X_i$, and the spatial downsampler downsamples the video to produce a smaller-resolution spatial domain video $x_i$. The smaller-resolution spatial domain video $x_i$ is input to a modified encoder 110. The modified encoder 102 also receives full-resolution parameters 102 from the decoder 50 to assist in the encoding process. The full-resolution parameters 102 include the motion vectors V, the macroblock modes M, and the full-resolution residuals (TCOEFs) U. As detailed above, the residuals U can be used to improve the accuracy of the initial motion vector refinement in some embodiments. This can improve the quality of the rate-distortion analysis and can result in better motion vector selection for the downsampled video.

As will be further detailed below, in some embodiments, the modified encoder 110 may also include improved motion vector initialization; that is, the techniques described below may be used to improve the quality of the initial motion vector initialization, which then justifies using a smaller search window for motion vector refinement/estimation. This aspect can improve the speed of the motion vector analysis and selection by reducing the number of candidate motion vectors requiring evaluation.

Figure 6:
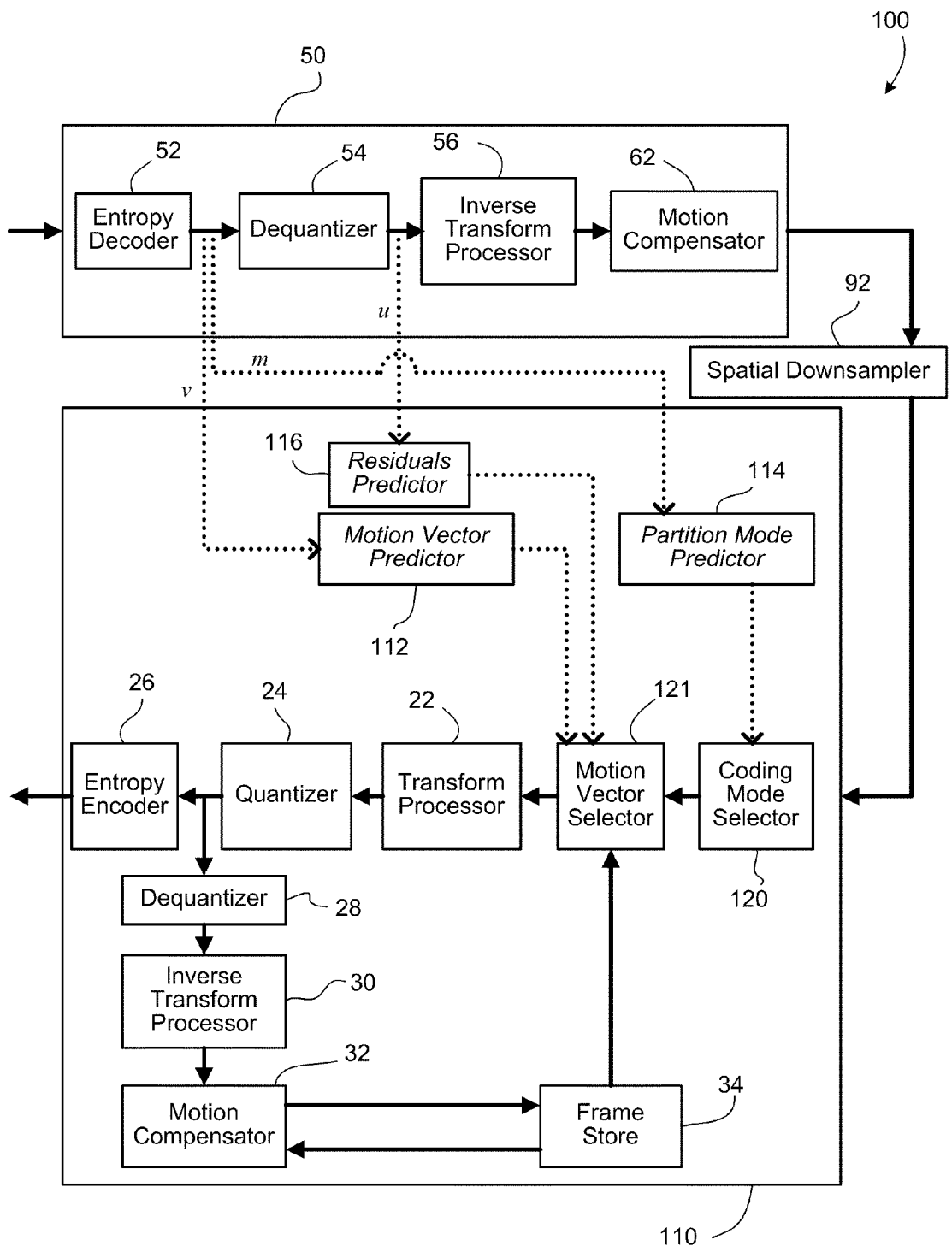
FIG. 6 shows a more detailed block diagram of the transcoder of FIG. 5.

Reference is now made to FIG. 6, which shows a more detailed block diagram of the example transcoder 100. The modified encoder 110 includes a motion vector predictor 112 that receives full-resolution motion vector V information from the decoder 50. The motion vector predictor 112 outputs an initial motion vector prediction, i.e. a motion vector initialization, based upon the full-resolution motion vector V information. The initial motion vector prediction is input to a motion vector selector 121 adapted to refine the motion vector to select a desired or optimal motion vector for a given macroblock partitioning. The motion vector selector 121 refines the motion vector by evaluating candidate motion vectors in a search window around the initial motion vector prediction.

The modified encoder 110 further includes a residuals predictor 116. The residuals predictor 116 receives the transform domain residuals (TCOEFs) U from the decoder 50, and specifically from the dequantizer 54. The residuals predictor 116 downsamples the transform domain residuals to create downsampled transform domain residuals, i.e. downsampled TCOEFs, denoted $DS(U_i)$. The downsampled TCOEFs are input to the motion vector selector 121. The motion vector selector 121 may use the downsampled TCOEFs in selecting a motion vector, based for example upon the optimization expression defined above in Equation (4).

The motion vector selector 121 may be configured to evaluate its selection of an optimal motion vector (using Equation (4)) against a threshold setting. If the selected optimal motion vector fails to result in a cost lower than the threshold setting, then the motion vector selector 121 may conclude that the initialization and refinement process did not succeed, and it may then perform a conventional H.264/AVC motion vector estimation process.

Referring still to FIG. 6, the modified encoder 110 includes a partition mode predictor 114. The partition mode predictor 114 receives full-resolution macroblock mode information M from the decoder 50. Based on the full-resolution macroblock mode information M and the downsampling ratio, the partition mode predictor 114 determines an initial macroblock mode for a particular macroblock of the downsampled video and provides the initial macroblock partitioning to a coding mode selector 120. The coding mode selector 120 may be adapted to use the initial macroblock partitioning in a bottom-up partition combination process to select a desired macroblock partitioning.

In one embodiment, and as will be described in greater detail below, the coding mode selector 120 stores the initial macroblock partitioning proposed by the partition mode selector 114 in a quad-tree data structure. Partitions are then recursively combined using a quad-tree traverse algorithm based on an evaluation of rate-distortion cost comparisons. If a combination fails to result in a rate-distortion cost improvement, then the combination is not made and the partitioning of that portion is set. To minimize computational complexity in at least one embodiment the coding mode selector 120 does not evaluate higher level combinations if a lower level combination does not result in a cost improvement. Further details are provided in the section below regarding partition mode selection.

It will be appreciated that the modified encoder 110 of the transcoder 100 shown in FIG. 6 includes three predictors (motion vector predictor 112, residuals predictor 116, and partition mode predictor 114) for initializing some estimates and parameters in order to speed-up the encoding process. In some embodiments, the modified encoder 110 may include a subset of these predictors or may include additional predictors that receive additional parameters from the decoder 50 for use in improving the speed or quality of the encoding process.

The follow section details more specific example embodiments of the motion vector selector 121, the motion vector predictor 112 and the residuals predictor 116, and the example implementation of various motion vector initialization and estimation/refinement processes.

Motion Vector Initialization and Refinement

When a full-resolution video is downscaled using a 2:1 ratio, the partition mode selected for the downscaled video may be a downscaled equivalent of the full-resolution video. For example, if the full-resolution video includes a macroblock having a 8×8 partition can be mapped to a 4×4 sub-partition in the downsampled macroblock. This is referred to as a direct-mappable macroblock. In many instances however, the partitioning in the full-resolution video may not be direct-mappable. For example, if the full-resolution macroblock includes sub-partitioning (SMB 8×4, SMB 4×8, SMB 4×4), then the partitioning is non-direct-mappable. The resulting partitioning in the downsampled macroblock cannot be smaller than 4×4, meaning mergers of partitions in the full-resolution video will be required. In yet other cases, as different partition modes are evaluated for the downsampled macroblock direct-mappable partitions may be combined to evaluate a more coarse partitioning. Additional details of the partition mode initialization and selection are set out in the section that follows.

Figure 7:
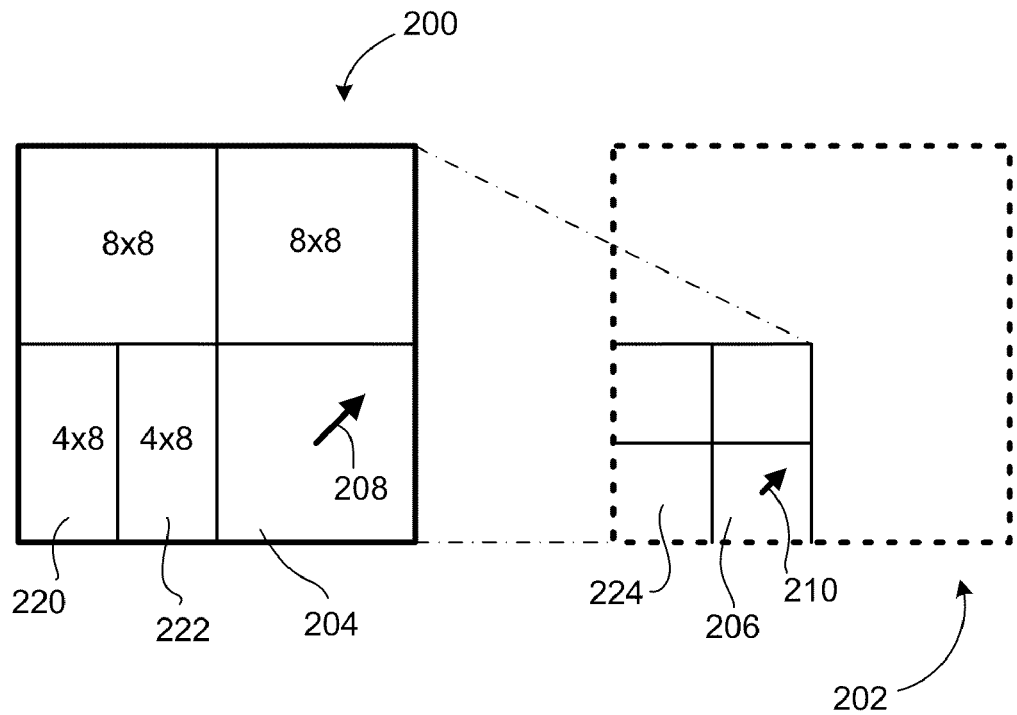
FIG. 7 shows an example illustration of a direct-mappable situation.

With direct-mappable partitions, the full-resolution motion vector for the full-resolution partition can be downscaled based on the downsampling ratio and may be directly used as the initial motion vector prediction for the downsampled partition. An example illustration of a direct-mappable situation is shown in FIG. 7. The full-resolution macroblock is denoted 200 and the downsampled macroblock is denoted 202. It will be noted that the full-resolution macroblock 200 corresponds to a quarter of the downsampled macroblock 202. The partitioning of the full-resolution macroblock 200 is mapped to the downsampled macroblock 202 directly, where possible. It will be noted that 8×8 partitions are mapped to 4×4 partitions in the downsampled macroblock 202.

Partition 204 corresponds to 4×4 partition 206 in the downsampled macroblock 202. Partition 204 has a motion vector 208. The motion vector 208 is downscaled by the downsampling resolution and mapped as a downscaled motion vector 210 for the partition 206 in the downsampled macroblock 202. This is a direct-mappable situation.

In non-direct-mappable situations, a partition within a downsampled macroblock may include more than one partition from the full-resolution macroblock, meaning that more than one motion vector is applicable to the downsampled partition. For example, in FIG. 7 it will be noted that the 4×8 partitions 220, 222, in the full-resolution macroblock 200 cannot be directly mapped to 2×4 partitions in the downsampled macroblock 202 since no such partitioning is permitted under H.264/AVC. Accordingly, these two partitions 220, 222 are combined as a single 4×4 partition 224.

In a non-direct-mappable case, a method is required to select the initial motion vector prediction based on having more than one downscaled motion vector. In addition, when assessing whether to merge partitions a method is required to determine the motion vector of the merged partition. Some methods proposed for initializing a motion vector prediction in a non-direct-mappable situation include random selection, mean/median value, weighted averaging, and minimum-norm motion vector estimation.

Figure 8:
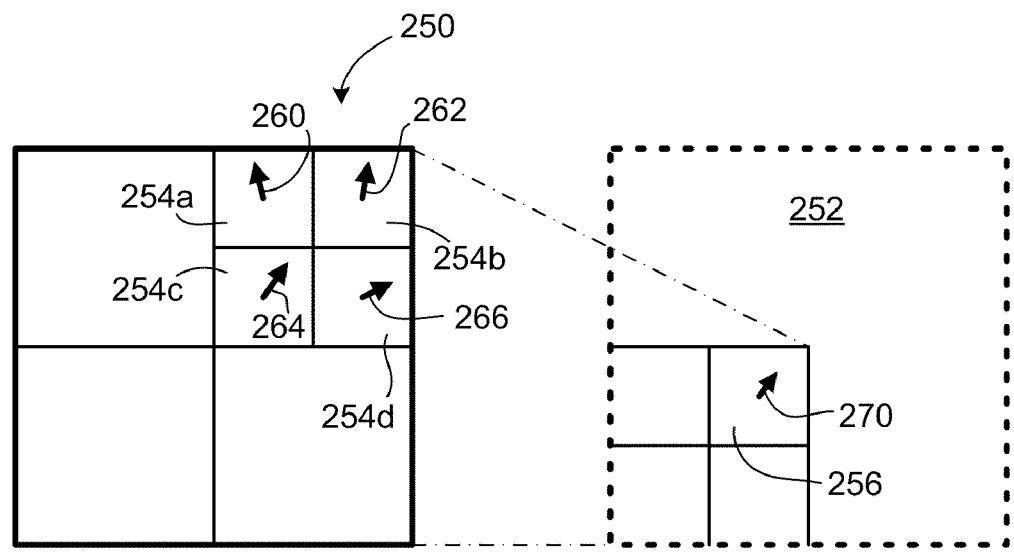
FIG. 8 shows an example illustration of a non-direct-mappable situation.

Reference is now made to FIG. 8, which illustrates a non-direct-mappable situation. In this example, a full-resolution macroblock 250 is partitioned such that it includes a set of 4×4 sub-partitions 254 (shown individually as 254a, 254b, 254c, 254d). The sub-partitions 254 correspond to a single 4×4 sub-partition 256 within a downsampled macroblock 252. Each of the sub-partitions 154 in the full-resolution macroblock 250 has an associated motion vector 260, 262, 264, 266. The motion vectors 260, 262, 264, 266 may differ from each other. It is assumed for the purpose of this example that the motion vectors 260, 262, 264, 266 point to the same reference frame.

To select a motion vector 270 for the 4×4 sub-partition 256 in the downsampled macroblock 252, a process is needed to select an initial motion vector prediction based on the four full-resolution motion vectors 260, 262, 264, 266.

Novel methods of performing a motion vector prediction in a non-direct-mappable situation or when merging partitions are described below.

Residual-Based Weighted Averaging

In accordance with one aspect of the present application the downscaled motion vectors within a partition are combined using a weighted average operation. The weighting of each motion vector is based upon the corresponding full-resolution residual information U obtained from the residuals predictor 116 (FIG. 6). A generalized expression for determining the initial motion vector prediction based upon two or more full-resolution motion vectors is:

$$v_{predict,k} = \sum_{\forall i \in k} v_i w_i, \text{ where } \sum_{\forall i \in k} w_i = 1 \quad (5)$$

In Equation (5), $v_i$ is the downscaled motion vector i and $w_i$ is the weighting factor for motion vector i. There are k full-resolution partitions (and thus, k motion vectors) combined into the single target downsampled partition.

A first example weighting factor $w_i$ assigns greater weight to motion vectors that have more significant residuals. This may be suitable in some situations, such as when Equation (4) is used to assess rate-distortion cost for refinement in the selection of the motion vector. The first example weighting factor may, in this embodiment, be expressed as:

$$w_i = \frac{\|DC_i\| + \sum_{\forall j \in TCOEFs\_AC} \|AC_{i,j}\|}{\sum_{\forall m \in k} \left( \|DC_m\| + \sum_{\forall j \in TCOEFs\_AC} \|AC_{m,j}\| \right)} \quad (6)$$

In Equation (6), $DC_i$ is the DC coefficient of the partition or block associated with motion vector $v_i$, and $AC_{i,j}$ is the $j^{th}$ AC coefficient of the partition or block associated with motion vector $v_i$. In other words, Equation (6) represents a weighting of the residual "energy" or magnitude of the $i^{th}$ partition relative to the overall residual "energy" of all k partitions that make up the target partitions in the downsampled macroblock.

Note that the DC and AC coefficients referred to above are the full-resolution transform domain residuals. In some other example embodiments, downscaled residuals may be obtained from the residuals predictor 116 to be used to develop the weighting factors.

In this example, the weighting factor defined in Equation (6) gives greater influence to the motion vector associated with larger magnitude residuals. This weighting is based on the notion that if we want to reuse the residuals, then we want to select an initial motion vector that matches well with the residuals. If at least one of the partitions has a large residual, then it is highly likely that the residual for the combined partition is likely to be non-zero. In fact, it is likely that the residual of the combined partition will be most heavily influenced by the downsampled partition that had the largest non-zero residual. Accordingly, the motion vector associated with that downsampled partition is likely influential, is likely a close match to the residuals, and is a desirable candidate for an initial motion vector. Therefore, it is given greater weight in Equation (6); in fact, a weight proportionate to the magnitude of its associated residuals.

A second example weighting factor $w_i$ takes the opposite approach and assigns a greater weight to partitions that have a lower residual "energy" or magnitude. This approach meshes well with motion vector refinement based upon Equation (2), i.e. the conventional approach to refinement that ignores residuals. The second example weighting factor may, in this embodiment, be expressed as:

$$w_i = \frac{e^{-\left(\|DC_i\| + \sum_{\forall j \in TCOEFs\_AC} \|AC_{i,j}\|\right)}}{\sum_{\forall m \in k} \left(e^{-\left(\|DC_m\| + \sum_{\forall j \in TCOEFs\_AC} \|AC_{m,j}\|\right)}\right)} \quad (7)$$

Either the first example weighting factor or the second example weighting factor may be used to select an initial motion vector prediction, depending on the particular application. In one embodiment, the first example weighting factor is used to select an initial motion vector prediction and Equation (4) is used to refine the motion vector estimation. If the resulting motion vector does not realize a minimum cost less than a threshold setting, then the second example weighting factor may be used to select a new initial motion vector prediction and Equation (2) may be used to refine the motion vector estimation.

The use of transform domain residual information in weighted averaging of motion vectors to make an initial motion vector prediction results in generally more accurate motion vector predictions, which in turn justifies using smaller search areas around the search center pinpointed by the prediction. The ability to use a smaller search area in the refinement process implemented by the motion vector selector 121 results in reduced computation complexity and speeds the encoding process.

Union of Search Centers

In another aspect, the downscaled motion vectors may be treated as each defining a separate search center. Each downscaled motion vector pinpoints a search center within the reference frame. A small search area may be defined around each search center. To the extent that the motion vectors are similar, the search areas will have substantial overlap. To the extent that they diverge, the search areas will cover a wider range of candidate motion vectors. In other words, the more divergent the downscaled full-resolution motion vectors are, the larger pool of candidate motion vectors that are evaluated.

Figure 9:
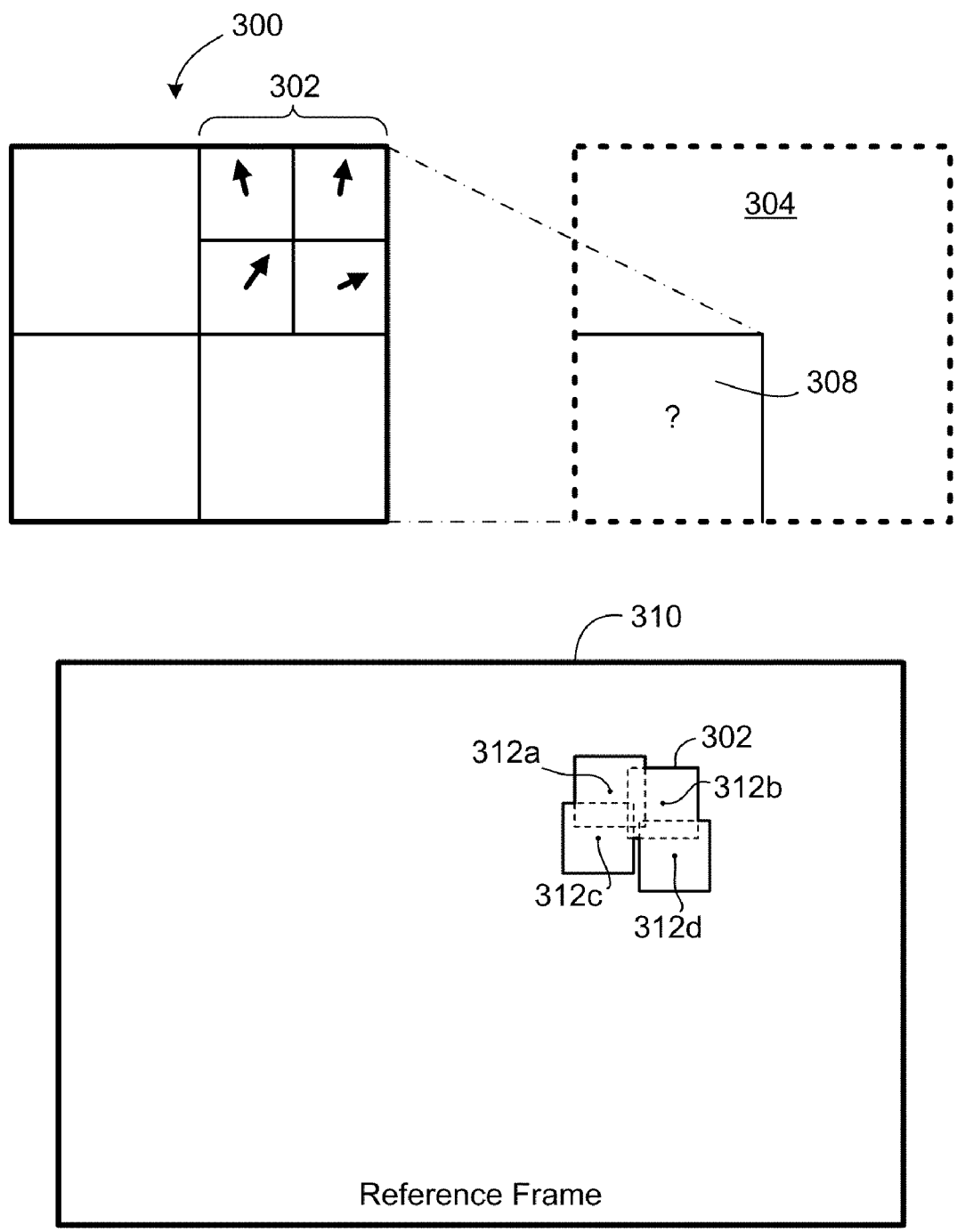
FIG. 9 illustrates a union-based motion vector prediction process.

Reference is now made to FIG. 9, which illustrates the union-based motion vector prediction process. A full-resolution macroblock 300 includes a set of sub-partitions 302 that map to a single sub-partition 308 within the downsampled macroblock 304. The four motion vectors from the set of sub-partitions 302 are downscaled and applied to a reference block 310 to define four search centers 312 (individually indicated as 312*a*, 312*b*, 312*c*, and 312*d*). A search area is defined around each of the search centers 312. In this embodiment, the search areas overlap to some degree. The resulting union of search areas defines the unified search area 314, within which candidate motion vectors are evaluated in the motion vector refinement process.

It will be appreciated that some embodiments may use either the residual-based weighting method to make an initial motion vector prediction or the union-based method of defining a search area (which may be considered using multiple initial motion vector predictions). In either case, the motion vector selector 121 then refines motion vector selection by selecting the candidate motion vector within the search area that results in the lowest rate-distortion cost, as evaluated using Equation (4) or Equation (2), for example. It will also be understood that the transcoder 100 may be adapted to use both methods.

Figure 10:
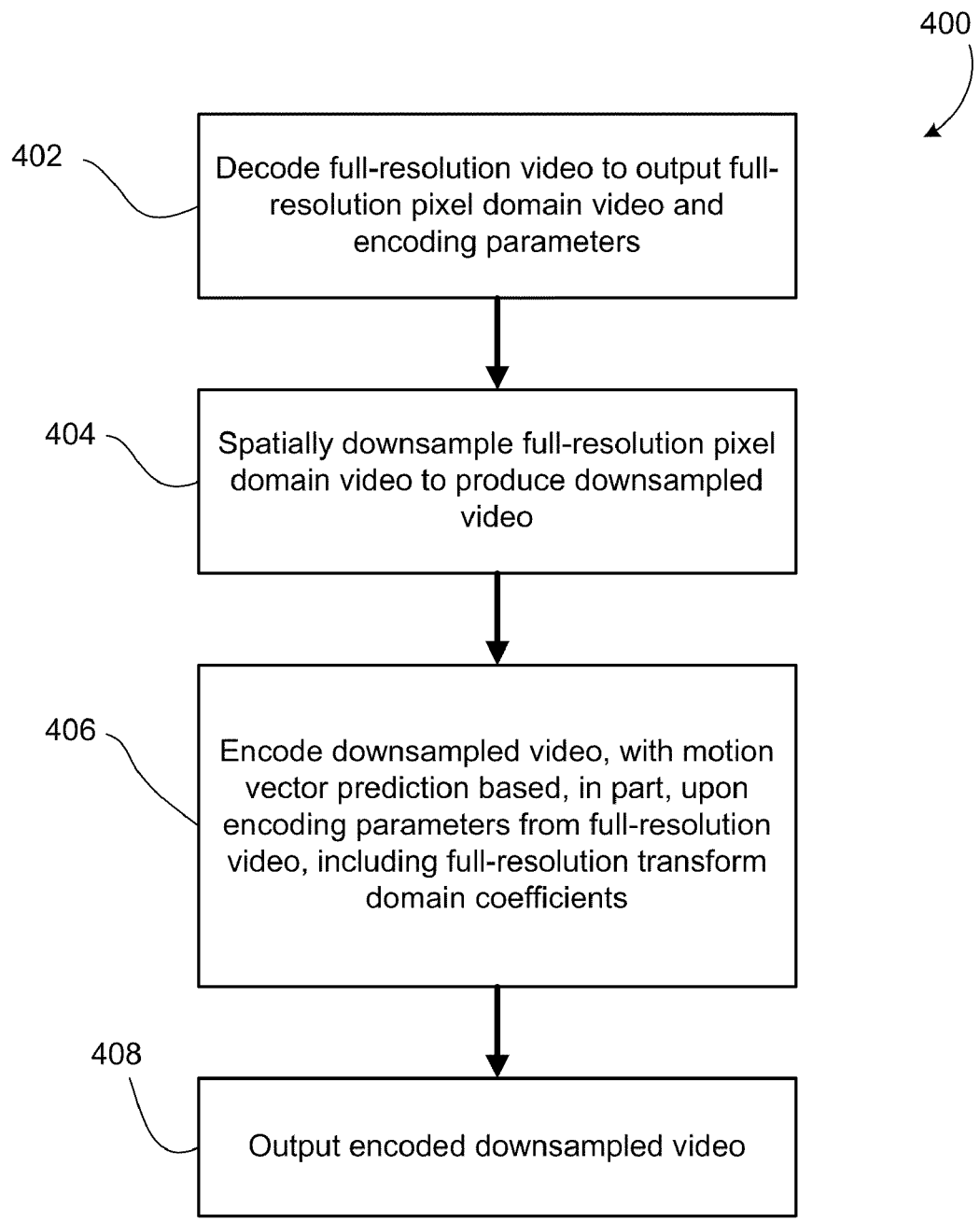
FIG. 10 shows, in flowchart form, an example method for transcoding video.

Reference is now made to FIG. 10, which shows, in flowchart form, an example method 400 for transcoding video. In this example, the method 400 involves spatial downsampling of an H.264/AVC encoded input video. The method 400 includes step 402, which involves decoding an encoded full-resolution video so as to reproduce a full-resolution pixel domain video. The decoding includes entropy decoding the encoded video, and thereby recovering the encoded motion vectors, partition mode (macroblock or coding mode) and quantization parameters. The partitioned macroblocks are then dequantized and inverse transformed to recover the residual data for each of the partitions (it will be understood that individual partitions may in some instances be made up of multiple transform blocks, depending on their size). The residual data is then used to reconstruct the pixel data based on a reference block from a reference frame, in the case of a motion compensated inter-coded macroblock. The reconstructed frame is then stored in the frame store for use in reconstructing other frames/macroblocks. Step 402 includes outputting certain encoding parameters or data recovered during the decoding process, such as the motion vectors and residual data.

The output full-resolution decoded video is then spatially downsampled to the desired or target resolution in the pixel domain, as indicated by step 404. Any spatial downsampling routine or process may be used. In this example, dyadic spatial downsampling—that is, by a factor of 2 in both the x- and y-directions—is assumed; although, the present method 400 is more broadly applicable to arbitrary downsampling ratios. The downsampling in step 404 results in a target resolution video, i.e. the downsampled pixel domain video.

In step 406, the downsampled pixel domain video is encoded to produce an encoded downsampled video. The encoding process includes selecting a coding mode, performing motion estimation when applicable to determine motion vectors and residual data, performing transform domain processing and quantization, and entropy encoding. With regard to the motion estimation, step 406 includes selecting a motion vector based, at least in part, upon at least two full-resolution motion vectors and downsampled full-resolution residual data associated with the full-resolution motion vectors recovered in step 402.

The encoded downsampled video is output in step 408.

Figure 11:
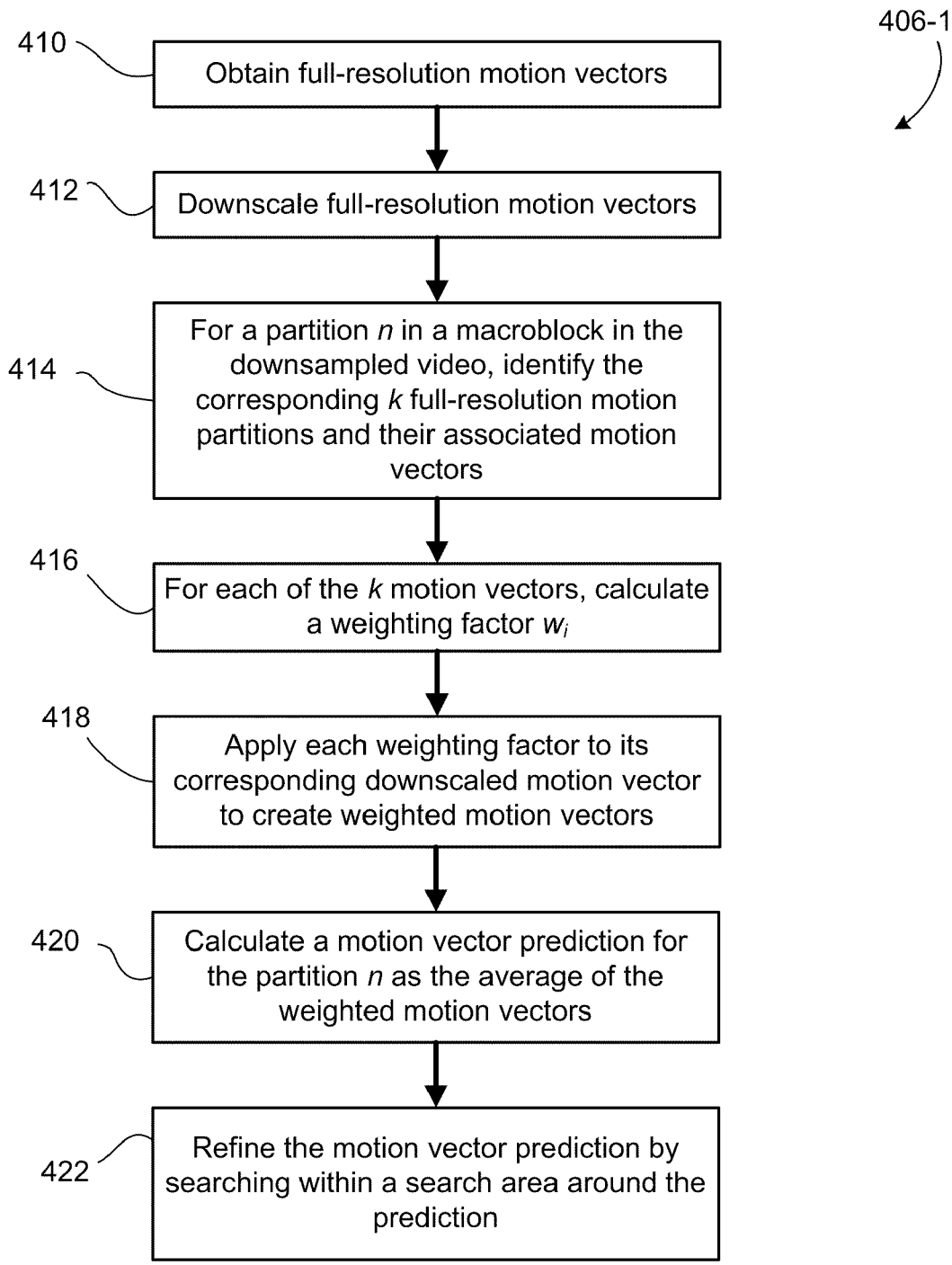
FIG. 11 shows, in flowchart form, an example method for selecting a motion vector during transcoding.

Further details of an example implementation of at least a portion of step 406 is shown, in flowchart form, in FIG. 11. FIG. 11 shows a first embodiment of step 406, denoted as method 406-1.

Method 406-1 begins with step 410, in which full-resolution motion vectors for are obtained from the decoding performed in step 402 (FIG. 10). The full-resolution motion vectors are downscaled in step 412. The motion vectors are downscaled by the scaling ratio of the downsampling.

In step 414, the full-resolution motion vectors relevant to a particular partition in the downsampled video are identified. As noted previously, the downsampling may necessarily result in some partitions from the full-resolution video being combined into a partition in the downsampled video, particularly where the full-resolution video contains sub-partitions, like 4×4 or 4×8 partitions. As well, as different partitions/coding modes are evaluated, partitions within the downsampled video may be combined to make larger partitions. In any of these scenarios, a given partition in the downsampled video may related to an area of the pixel-domain frame containing one or more corresponding partitions in the full-resolution video. By way of example, a 2:1 downsampling (in both x- and y-directions) means that each 16×16 macroblock in the downsampled video contains four 16×16 macroblocks of the full-resolution video.

Step 414 involves identifying the k partitions from the full-resolution video that correspond or fall within a particular partition of the downsampled video, and their corresponding downscaled motion vectors. In this example, for the particular partition, there are k corresponding full-resolution motion vectors. It will be appreciated that in some embodiments there may be more than k motion vectors if the full-resolution video has more than one motion vector for at least one of the partitions, as may be permitted under some video encoding standards. For the purpose of the present discussion, it is assumed that all motion vectors point to the same reference frame; however, the present application is not limited to that situation.

In step 416, a weighting factor $w_i$ is calculated for each of the k motion vectors. In accordance with one aspect of the present application, the weighting factor $w_i$ is based, at least in part, upon residual data recovered from the encoded full-resolution partitions. Equations (6) and (7) are example calculations that may be used to determine the weighting factor $w_i$.

Having calculated a weighting factor $w_i$ for each of the k motion vectors, then in step 418 each weighting factor $w_i$ is applied (e.g. multiplied) to the $i^{th}$ motion vector to generate weighted motion vectors. The method 406-1 then involves calculated a motion vector prediction for the particular partition by calculating the average of the weighted motion vectors, as indicated by step 420. The motion vector prediction may then be used as the seed point defining a search area, from which a refined motion vector is selected. The search area may be a preset number of pixels in the reference frame around the seed point indicated by the motion vector prediction. The selection may be based, for example, upon an optimization analysis using the optimization expressions of Equation (2) or Equation (4).

Method 406-1 results in selection of a refined motion vector for the particular partition of the downsampled video. It will be appreciated that step 406 (FIG. 10) may include repeating method 406-1 for each partition of each inter-coded macroblock in each frame of the downsampled video. It will also be appreciated that step 406 may include repeating method 406-1 for each candidate partition/coding mode under evaluation in selecting an optimal coding mode for encoding a given macroblock of the downsampled video.

Figure 12:
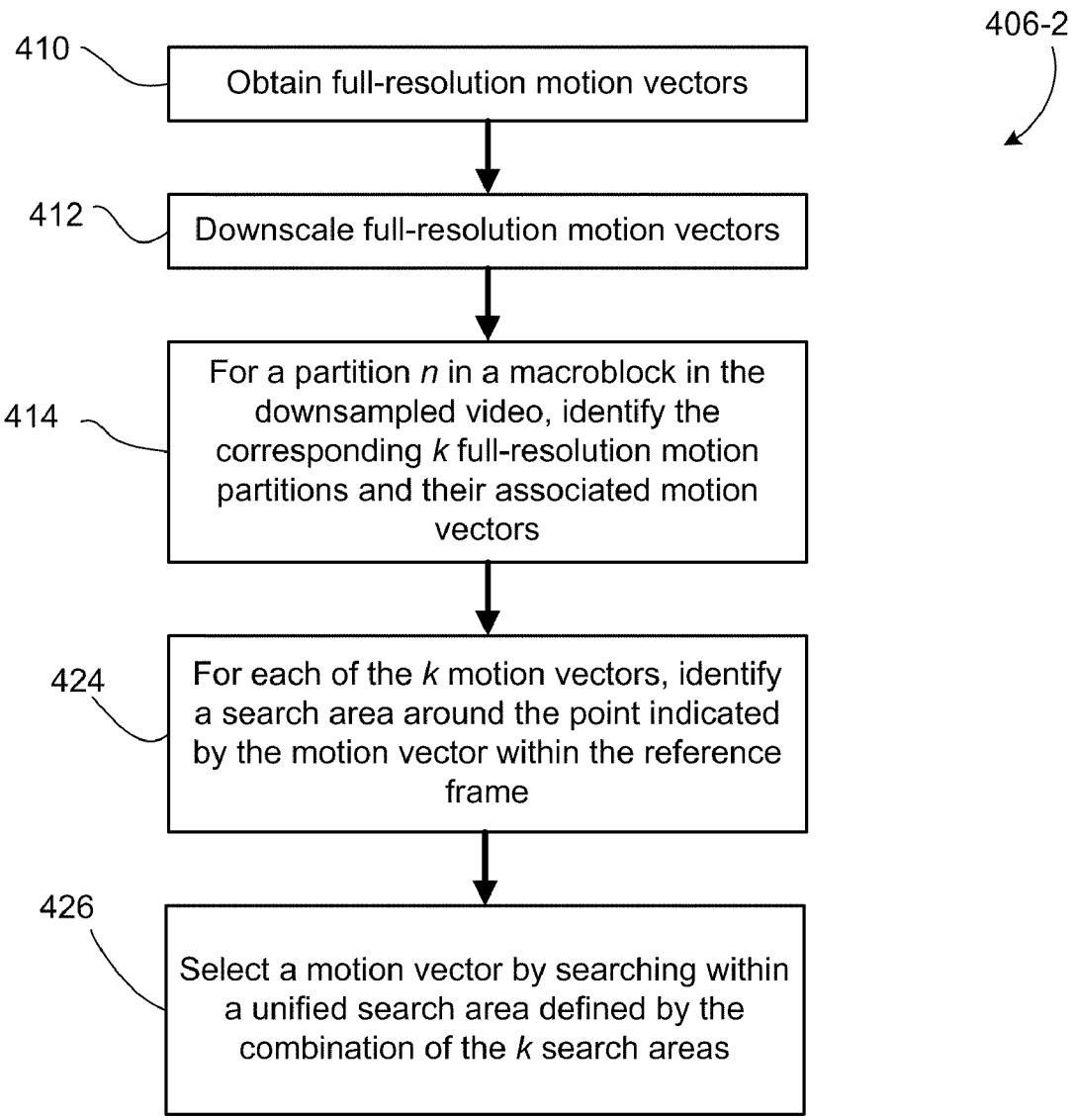
FIG. 12 shows, in flowchart form, another example method for selecting a motion vector during transcoding.

Reference is now made to FIG. 12, which details, in flowchart form, another example implementation of at least a portion of step 406, denoted as method 406-2. Method 406-2 is an example implementation of the "union of search centers" embodiment of motion vector selection detailed above.

Method 406-2 includes steps 410, 412, and 414 for obtaining, downscaling, and identifying corresponding full-resolution motion vectors for a particular partition in the downsampled video. Method 406-2 further includes step 424, in which a search area is identified within the reference frame for each of the k downscaled motion vectors that are relevant to the particular partition. In other words, k search areas are defined within the reference frame. Some or all of the k search areas may overlap to some degree.

In step 426, a motion vector is selected based on a search within the search area defined by the union of the k search areas. The selection may be based on an optimization analysis, such as that detailed in Equation (2) or Equation (4). Method 406-2 results in selection of a refined motion vector for the particular partition of the downsampled video.

It will be appreciated that step 406 (FIG. 10) may include repeating method 406-1 or method 406-2, as the case may be, for each partition of each inter-coded macroblock in each frame of the downsampled video. It will also be appreciated that step 406 may include repeating method 406-1 or method 406-2 for each candidate partition/coding mode under evaluation in selecting an optimal coding mode for encoding a given macroblock of the downsampled video.

In some embodiments, a given transcoder may be configured to implement both method 406-1 and 406-2, and the method used in a given application may be selectable. In yet other embodiments, the transcoder may use method 406-1 and, if the resulting rate-distortion analysis does not result in a cost below a threshold, may resort to method 406-2 as a back-up.

Quad-Tree-Based Macroblock Mode Initialization and Refinement

As noted above in connection with FIG. 6, the partition mode predictor 114 receives full-resolution macroblock mode information M from the decoder 50. Based on the full-resolution macroblock mode information M and the downsampling ratio, the partition mode predictor 114 determines an initial macroblock mode for a particular macroblock of the downsampled video and provides the initial macroblock partitioning to a coding mode selector 120. The coding mode selector 120 may be adapted to use the initial macroblock partitioning in a bottom-up partition combination process to select a desired macroblock partitioning. In at least one embodiment the coding mode selector 120 is adapted to employ a quad-tree-based data structure for implementing the bottom-up partition combination process.

Table 1, below, illustrates an example mapping of macroblock modes for a dyadic (2:1) downsampling ratio, in which for every four macroblocks from the full-resolution video there is one macroblock in the downsampled video. Decoded partitions of each full-resolution macroblock are mapped into target partitions according to downsampling ratio. In this example, the middle column, labeled "Mapped MB_Mode" indicates the partition that results from a direct mapping. The third column, labeled "Initialed MB_Mode" indicates the actual partitioning that will be used initially.

TABLE 1

Macroblock mode mapping and initialization

| Input MB_Mode | Mapped MB_Mode | Initialed MB_Mode |
|---|---|---|
| P16X16 | SMB8X8 | SMB8X8 |
| P16X8 | SMB8X4 | SMB8X4 |
| P8X16 | SMB4X8 | SMB4X8 |
| P8X8 | SMB4X4 | SMB4X4 |
| SMB8X8 | SMB4X4 | SMB4X4 |
| SMB8X4 | 4x2 (undefined) | SMB4X4 (merged) |
| SMB4X8 | 2x4 (undefined) | SMB4X4 (merged) |
| SMB4X4 | 2x2 (undefined) | SMB4X4 (merged) |

If a macroblock contains only partitions that can be directly mapped to a downsampled partition, such as the P16×16, P16×8, P8×16, P8×8 and SMB8×8 partitions, then the macroblock is direct-mappable. A non-direct-mappable macroblock contains non-direct-mappable partitions, such as SMB8×4, SMB4×8, and SMB4×4, and in this case the non-direct-mappable partitions are merged with corresponding neighbouring non-direct-mappable partions to create the initial partitioning in the downsampled video.

It will be appreciated that the largest initial partitioning in the downsampled video will be 8×8. Each 8×8 block is combined with its three 8×8 neighbours to create a 16×16 macroblock in the downsampled frame. The macroblock so defined has an initial layout pattern determined by the partitioning of its constituent 8×8 blocks.

In order to find improvements in coding efficiency, the coding mode selector 120 determines whether to modify the initial partitioning of the downsampled macroblock. In this embodiment, initialized macroblock partitions may be represented in memory in a quad-tree data structure. The coding mode selector 120 may then employ a greedy algorithm to combine the partitions by traversing the quad-tree in a bottom-up manner. The greedy criterion is based on rate-distortion cost for each partition, by employing Equation (3). If the cumulative rate-distortion cost over a set of combinable partitions (e.g. two SMB8×4 partitions) is larger than the rate-distortion cost of coding as a whole (i.e. merged) partition (e.g. one SMB8×8 partition), then the two combinable partitions are merged. This combining process is carried out recursively until the quad-tree-based partition layout reaches a stable state, which is then selected as the macroblock mode for the given downsampled macroblock.

It will be recognized that such tree-based traversing does not necessarily evaluate all supported macroblock modes. The coding mode selector 120 starts with an initial macroblock mode determined by mapping the full-resolution macroblock modes to the downsampled macroblock, subject to the need to merge non-direct-mappable partitions. It then combines partitions in the layout if the specific combination leads to a rate-distortion improvement. Although this process can lead the rate-distortion performance towards a local minimum, it will not necessarily yield a globally optimized macroblock mode in all cases.

For example, if the initialized macroblock mode is P8×8, with each sub-partition all SMB8×4, the coding mode selector 120 will not evaluate rate-distortion costs of potential SMB4×4 partitions, since the initial partitioning of SMB8×4 is the smallest possible partition size (leaf level) in the quad-tree. In another example, if the coding mode selector 120 evaluates two SMB8×4 partitions and the rate-distortion analysis does not justify a merger of the two partitions into one SMB8×8 partition, then the coding mode selector 120 will not evaluate a P16×16 partition.

Figure 13:
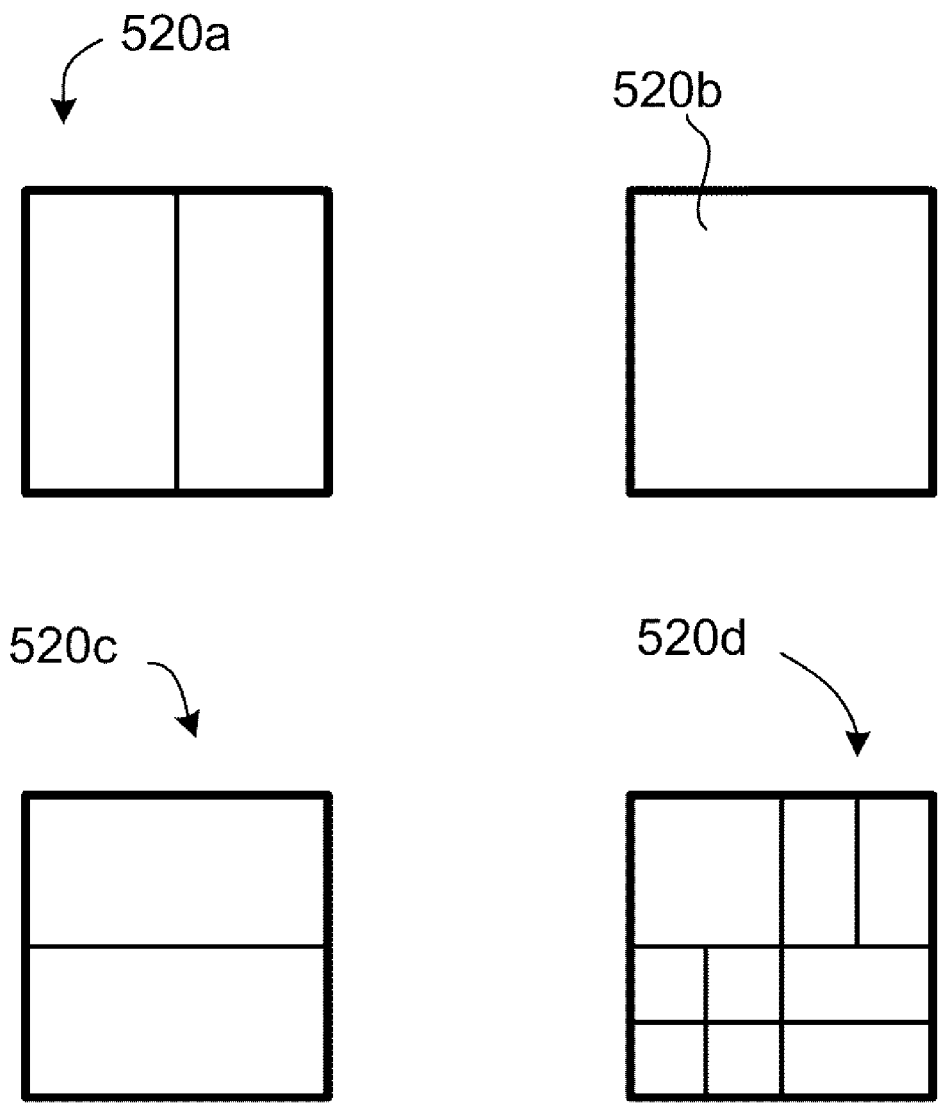
FIG. 13 shows an example illustration of four full-resolution macroblocks.
Figure 14:
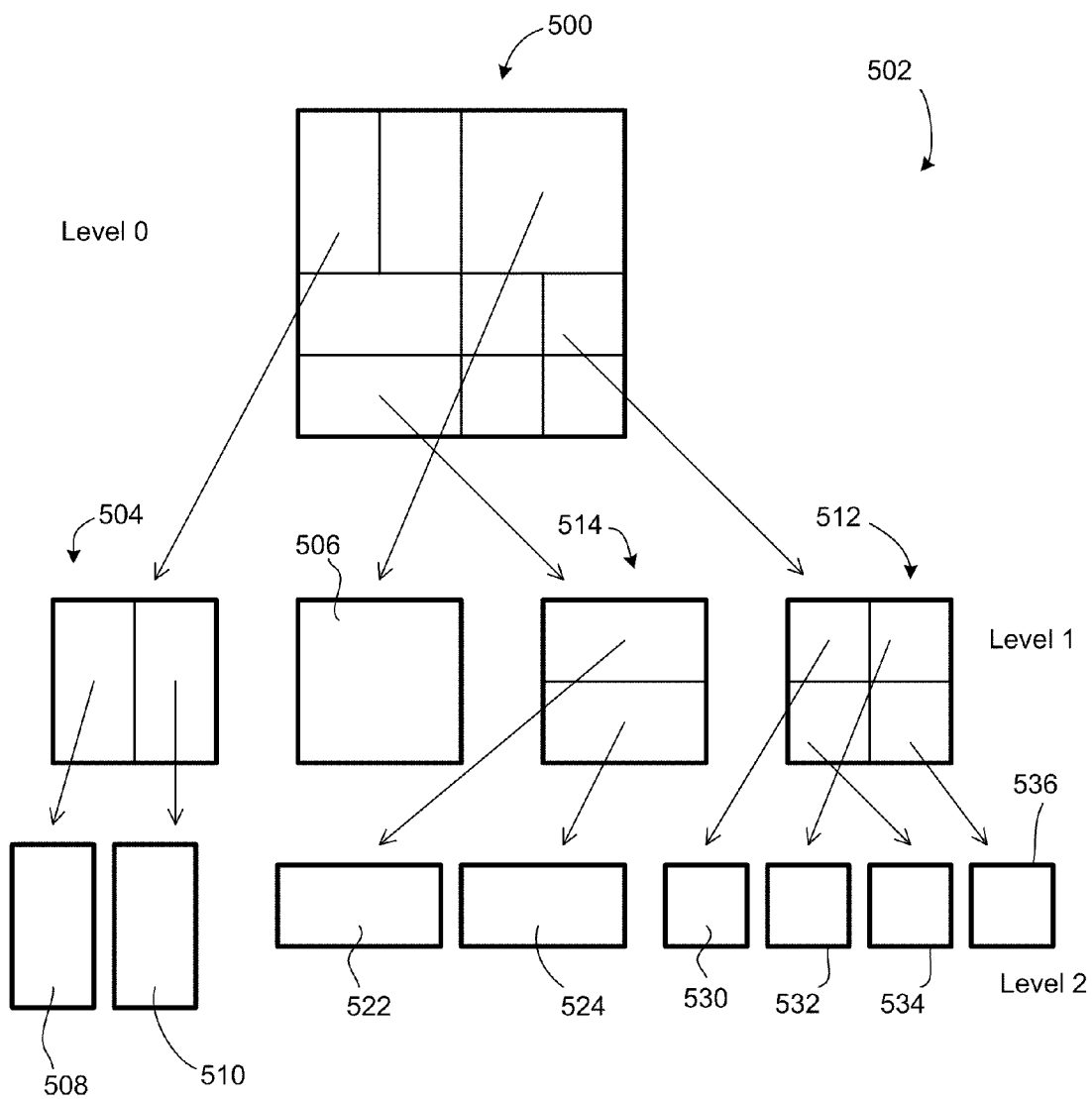
FIG. 14 shows an example illustration of a downsampled macroblock based on the four full-resolution macroblocks of FIG. 13, in a quad-tree data structure.

Reference is now made to FIGS. 13 and 14 to provide an illustrative example. FIG. 13 shows an example of four full-resolution macroblocks 520a, 520b, 520c, 520d. The full-resolution partitioning of these four macroblocks is illustrated in FIG. 13. It will be noted that the first full-resolution macroblock 520a includes two 8×16 partitions. The second macroblock 520b contains only one 16×16 partition. The third macroblock 520c includes two 16×8 partitions. Finally, the fourth macroblock 520d includes partitioning into 8×8 quadrants, with three of the quadrants further partitioned into 4×8, 8×4 or 4×4 partitions.

FIG. 14 diagrammatically illustrates an example macroblock 500 in a quad-tree data structure 502. The example macroblock 500 is from the downsampled video corresponding to the macroblocks 520a-d of FIG. 13. It will be noted that the initial partitioning shown in the macroblock 500 reflects the partitioning of the example full-resolution macroblocks 520a-d except in the bottom right quadrant of the macroblock 500. In this quadrant, the full-resolution partitioning into 4×8, 8×4 or 4×4 has been merged so that the downsampled macroblock 500 contains no partition smaller than 4×4.

In this embodiment, the quad-tree data structure 502 includes three levels. The first level (Level 0) includes the 16×16 example macroblock 500. The initial partitioning of macroblock 500 is illustrated within the 16×16 block shown in Level 0.

The second level (Level 1) includes a node for each of the 8×8 quadrants of the macroblock. It will be noted that the initial partitioning means that a first quadrant 504 results in a node with an 8×8 block partitioned into two 4×8 partitions. These two partitions are then represented at the third level (Level 2) as two 4×8 leaf nodes 508, 510.

The second quadrant 506 contains an initial partitioning of 8×8, so it is itself a leaf node at Level 1.

The third quadrant 514 contains an initial partitioning into two 8×4 partitions 522, 524 at Level 2.

The fourth quadrant 512 includes an initial partitioning that divides the 8×8 block into its 4×4 quadrants 530, 532, 534, and 536, shown at Level 2.

Figure 15:
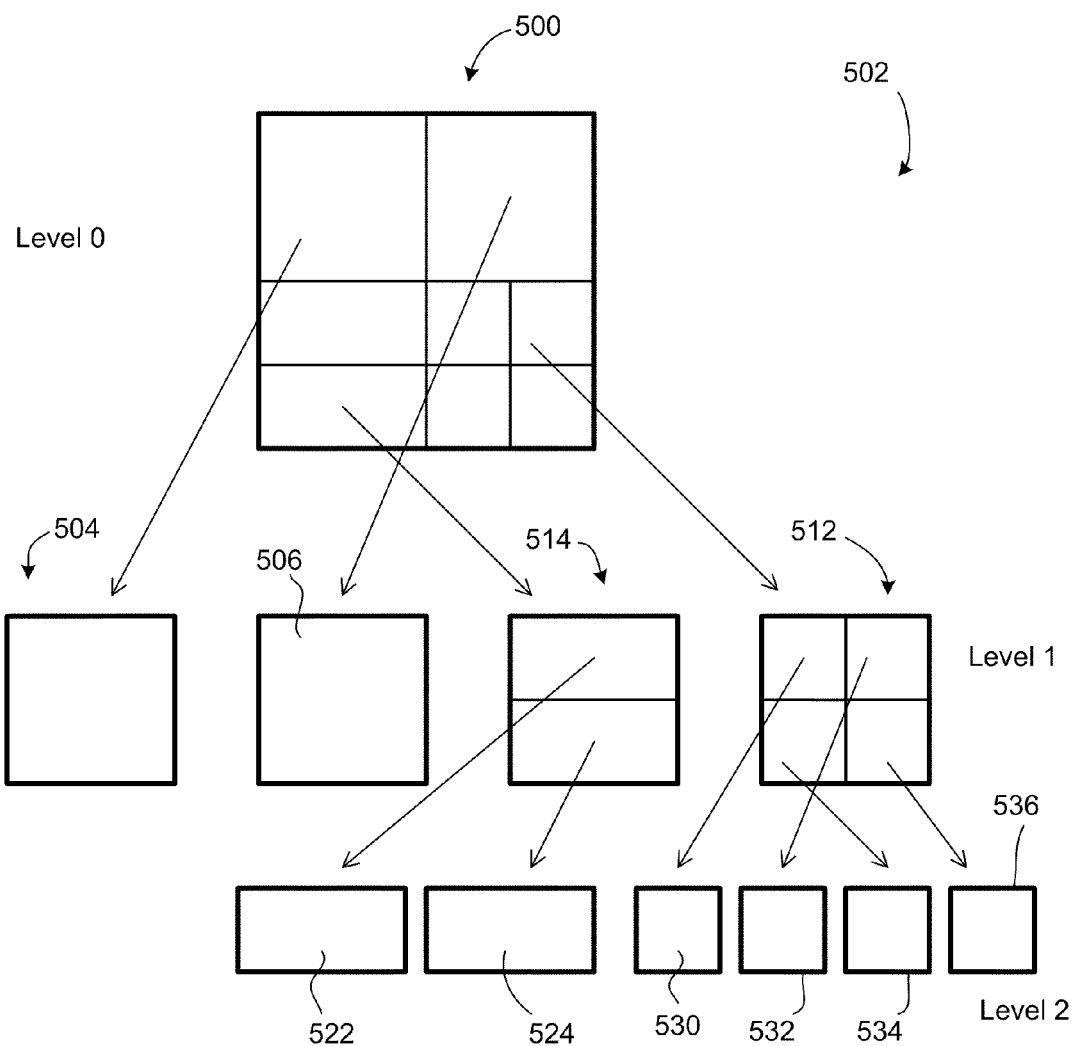
FIGS. 15-17 diagrammatically illustrate a partition refinement process for the example macroblock and quad-tree structure shown in FIG. 14.
Figure 16:
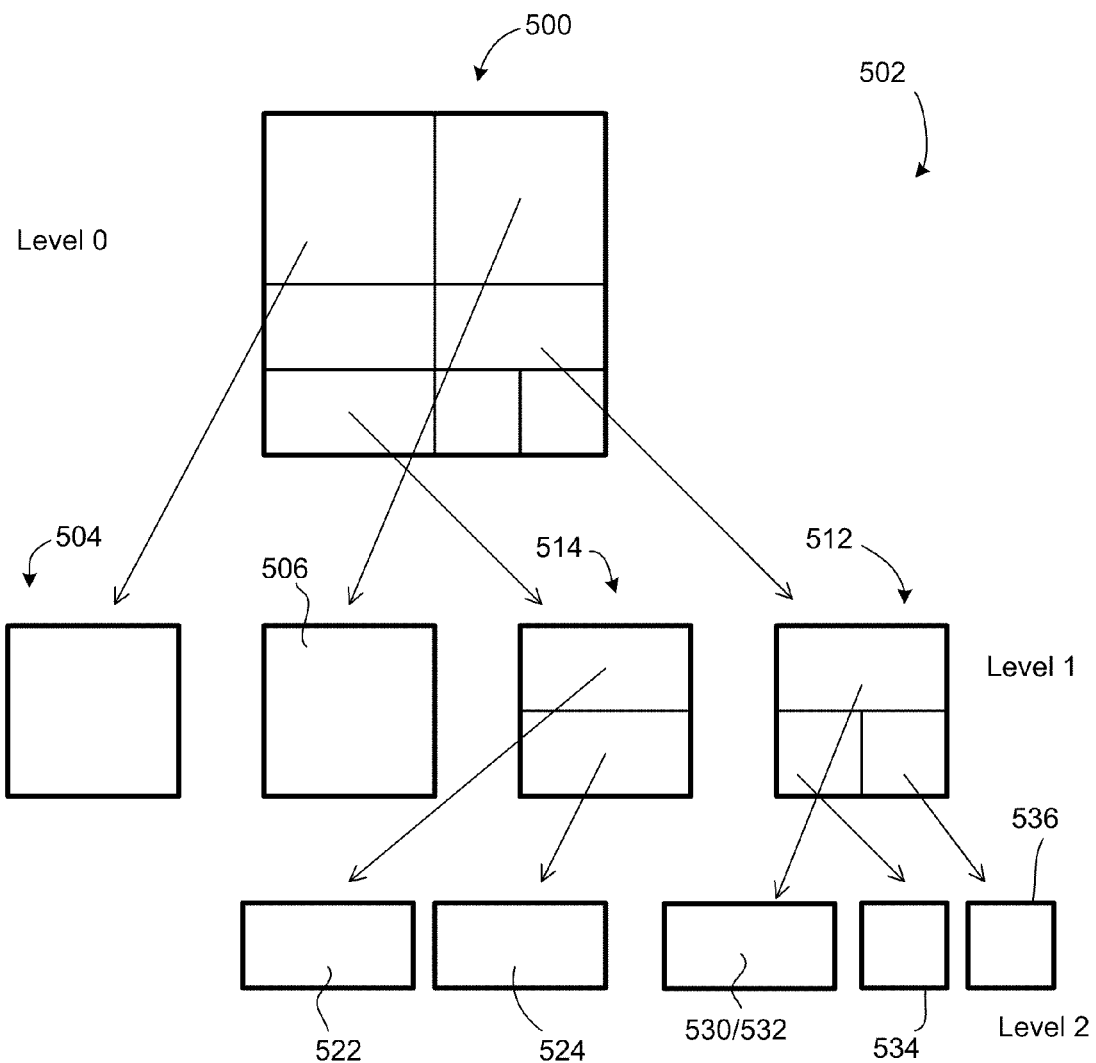
Figure 17:
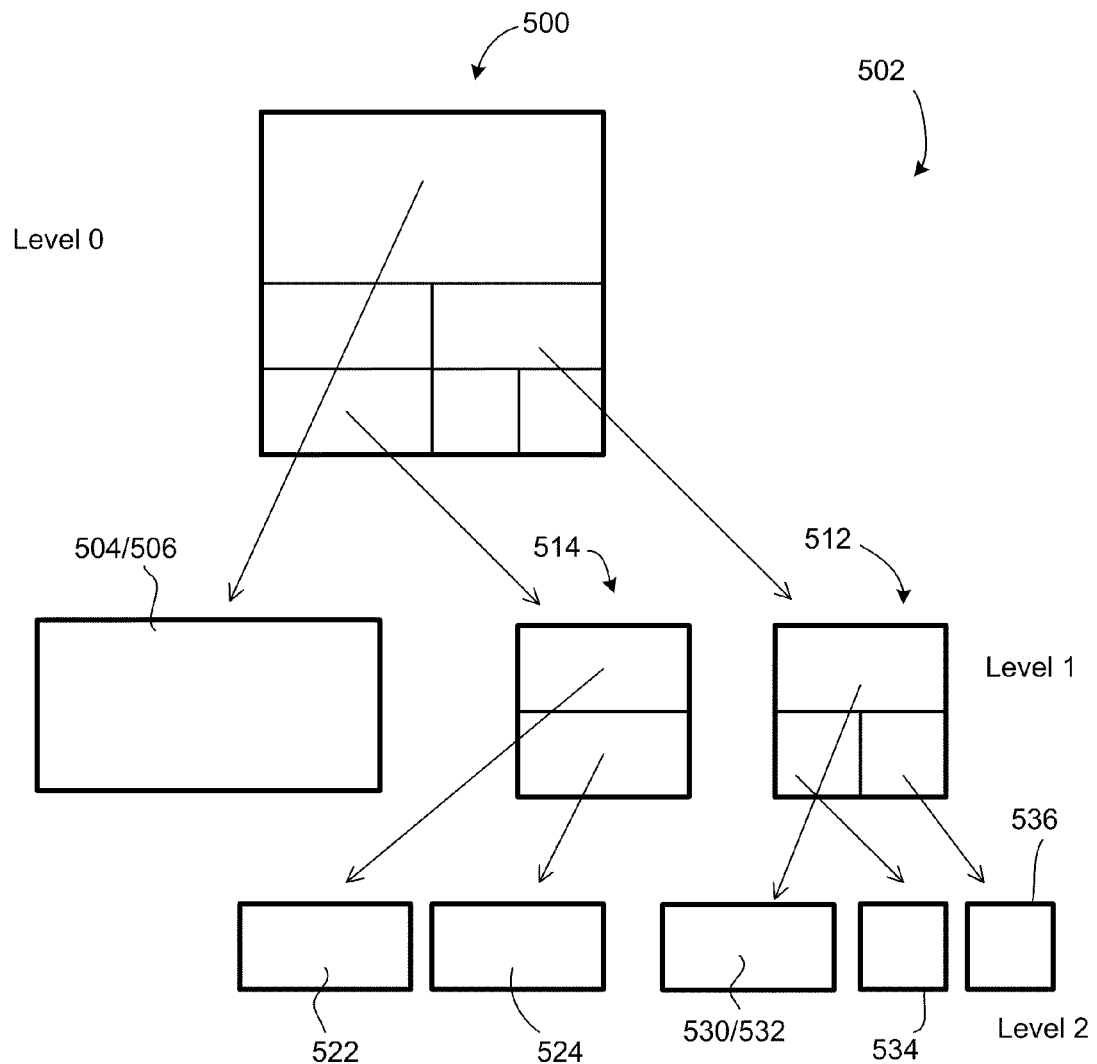

The process implemented by the coding mode selector 120 (FIG. 6) evaluates whether to combine leaf nodes. Leaf nodes may only be combined or merged if they result in a legitimate partition structure. FIGS. 15 through 17 diagrammatically illustrate the process for the example macroblock 500 and quad-tree structure 502 shown in FIG. 14. In FIG. 15, the coding mode selector 120 has determined the cost associated with encoding the Level 2 4×8 partitions 508, 510 (FIG. 14) (i.e. the rate-distortion cost associated with encoding the residuals and motion vectors for the two 4×8 partitions), and the cost associated with encoding the Level 1 8×8 partition (quadrant 504) if the leaf nodes were to be merged, and has concluded that the rate-distortion cost is lower if the merger occurs. Accordingly, the leaf nodes 508, 510 have been merged such that the quadrant 504 is now partitioned as a single 8×8 block.

In the present embodiment, the coding mode selector 120 evaluates possible mergers that result in a reduction in the number of leaf nodes. For example, it may evaluate whether to combine a pair of adjacent leaf nodes into a single partition. It may also consider whether four quarters may be combined into a whole. In such embodiments, the coding mode selector 120 may first evaluate whether to combine quarters into halves and may then also evaluate whether to combine quarters into a whole, and it may then select the most cost-advantageous merger option. In these cases, it will be noted that the coding mode selector 120 considers combinations of adjacent partitions that combine into a single partition, i.e. quarters into halves, quarters into a whole. However, it does not evaluate combinations that "skip" a level, i.e. eighths into a whole. If a merger of quarters into halves or a whole is not advantageous, then the merger does not occur and the quarters remain as they are in the partition structure.

In FIG. 16, the coding mode selector 120 in this example illustration has calculated the rate-distortion cost associated with the partitioning of the third quadrant 514 into two 8×4 partitions 522, 524, as compared with the rate-distortion cost associated with the possible merger of the two 8×4 partitions 522, 524 to create a single 8×8 partition for the third quadrant 514, and has concluded there is no costs savings associated with the merger.

The coding mode selector 120 has also evaluated the possible combinations of the four 4×4 quadrants 530, 532, 534, 536 into various 4×8 and 8×4 combinations. Based on a rate-distortion cost comparison amongst the various combinations, it has concluded that it would be advantageous to merge quadrants 530 and 532 into an 8×4 partition, but quadrants 534 and 536 remain 4×4 partitions. The merger is illustrated in FIG. 16.

Following the evaluations and mergers illustrated in FIG. 16, in this embodiment the coding mode selector 120, having concluded that mergers within the third quadrant 514 and fourth quadrant 512 are not advantageous, would forego evaluating any higher order mergers involving the third and fourth quadrants 514, 512. For example, it would not evaluate whether there is a rate-distortion cost savings if the third and fourth quadrants 514, 512 were to be merged themselves into a 16×8 partition within the macroblock 500. Similarly, it would not evaluate the costs of having a single 16×16 partition within the macroblock 500.

However, as illustrated in FIG. 17, the coding mode selector 120 has not reached such a "dead-end" or stop indicator with regard to mergers involving the first and second quadrants 504, 506. Accordingly, the coding mode selector 120 may next evaluate whether there is a rate-distortion cost savings associated with merging the first and second quadrants 504, 506 to create a 16×8 partition within the macroblock 500. In the example illustrated in FIG. 17 the coding mode selector 120 has determined that such a merger is advantageous based on a rate-distortion cost comparison, and the two quadrants 504, 506 have been merged to create a single 16×8 partition.

At this point no further mergers are evaluated and the process of traversing the quad-tree structure to search for leaf node mergers halts. The resulting partitioning of the macroblock 500 is the coding mode selected for the macroblock 500.

Those ordinarily skilled in the art will appreciate that additional constraints may prevent some merger possibilities. For example, the merger of partitions 504 and 506 may not be permissible under some coding standards. In particular, under the constraints of the coding scheme in H.264/AVC partitions 504 and 506 could not be merged to create a 16×8 partition unless the 514 and 512 partitions had been subject to mergers to create 8×8 blocks. In other words, a 16×8 partition would only be legitimate if the partitions 522 and 524 were merged to create a single 8×8 partition 514 and if the partitions 530-536 were merged to create a single 8×8 partition 512. Other restrictions may also be imposed by other coding schemes in other circumstances.

It will be appreciated that various modifications may be made to the process illustrated by way of the example in FIGS. 13-17.

Figure 18:
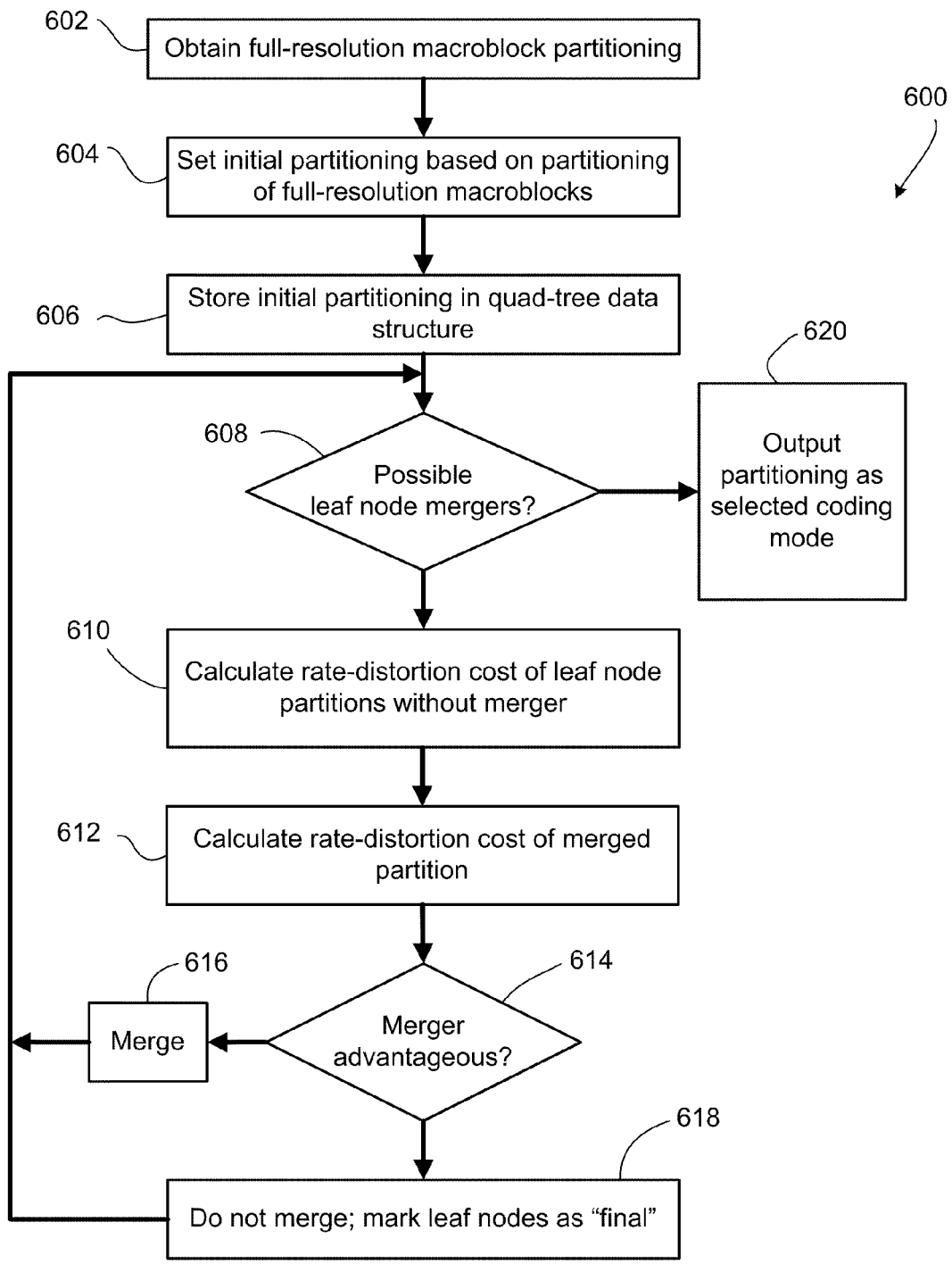
FIG. 18 shows, in flowchart form, example embodiment of a method of selecting a coding mode for transcoded video.

Reference is now made to FIG. 18, which shows, in flowchart form, an example embodiment of the method 600 of selecting a coding mode.

The method 600 begins with obtaining information regarding the full-resolution macroblock partitioning (step 602). This may be obtained during the decoding process within a transcoder, as outlined above. In step 604, the initial partitioning of a downsampled macroblock is established based on the partitioning of the full-resolution macroblocks that correspond to the downsampled macroblock. Minimum partition size may result in merger of full-resolution partitions into merged partitions within the downsampled macroblock. Table 1, above, provides an example set of rules for merging full-resolution partitions when creating an initial partitioning in a 2:1 downsampling situation in the context of H.264/AVC. Other situations may involve a different minimum partition size and a different downsampling ratio.

The initial partitioning is saved in a quad-tree data structure, in this embodiment, as indicated by step 606. In other embodiments, other data structures may be employed. More generically, step 606 involves saving the initial partitioning structure to memory.

In step 608 the coding mode selector 120 (FIG. 6) begins the merger evaluation process by identifying candidate leaf nodes for a merger. The coding mode selector 120 may traverse the quad-tree structure using a greedy merger process to determine when to combine leaf nodes. A leaf node is a candidate for merger if it can be combined with one or more adjacent leaf nodes to create a larger partition. Whether a leaf node can be combined with another leaf node may be governed by rules particular to an implementation. For example, in some instances a rule may specify that only mergers of two adjacent leaves are to be considered. In some instances, a rule may specify that only mergers that result in a level change within the quad-tree are to be considered. In some embodiments, leaf nodes may only be considered for merger if they have a common parent node. The term "parent node" refers to the partition directly above the leaf node. For example, referring again to FIG. 17, partitions 522 and 524 have a common parent node 514. Partitions 530/532, 534, and 536 have a common parent node 512. Partitions 522, 524 and 530-536 do not all have a common parent node, so a combination of all five leaves into a 16×8 partition could not be directly considered. Partitions 514 and 512 have a common parent node 500, but they are not leaf nodes so they cannot be considered for merger unless their sub-partitions have been merged such that they themselves become leaf nodes. Other embodiments may employ different rules.

In any case, if there are candidates for merger, then in step 610 the rate-distortion cost associated with the leaf node partitions is calculated, and in step 612 the rate-distortion cost associated with a merged partition is calculated. In step 614, if the merged partition results in a rate-distortion cost savings, then the leaf nodes are merged, as indicated in step 616. If no savings results, then the merger does not occur and, in this embodiment, in step 618 the leaf nodes are marked or otherwise indicated as being "final" or "set", meaning that no further evaluations of mergers involving these final leaf nodes occurs. In other words, those leaf nodes are no longer "candidates" for merger. In some other embodiments, other mergers involving the same leaf nodes may still be considered, in which case no marking of the leaf nodes occurs; however, in this embodiment if a merger is disadvantageous then the leaf nodes may cease to be candidates for other merger evaluations.

If, in step 608, no further merger candidates are available in the quad-tree, then the resulting partitioning represented by the quad-tree data is output as the coding mode selected for the particular downsampled macroblock.

Motion Estimation Using Full-Resolution Residuals

Referring again to Equation (4) above, it will be recalled that the motion estimation process may benefit from using full-resolution residual information. In particular, the full-resolution residuals may be downsampled and used as predicted residuals in the rate-distortion analysis for selecting a desired motion vector.

Reference may again be made to FIG. 10, which illustrates a method of encoding a downsampled video in which the encoder employs parameters derived from the decoding of the full-resolution video in performing the encoding of a downsampled video (step 416). The encoding may include selecting a motion vector based on minimizing the rate-distortion cost in accordance with Equation (4). That is, the selection of a desired motion vector for a given partition may be based on a rate-distortion analysis in which the distortion term includes downsampled full-resolution residuals (transform domain coefficients).

Figure 20:
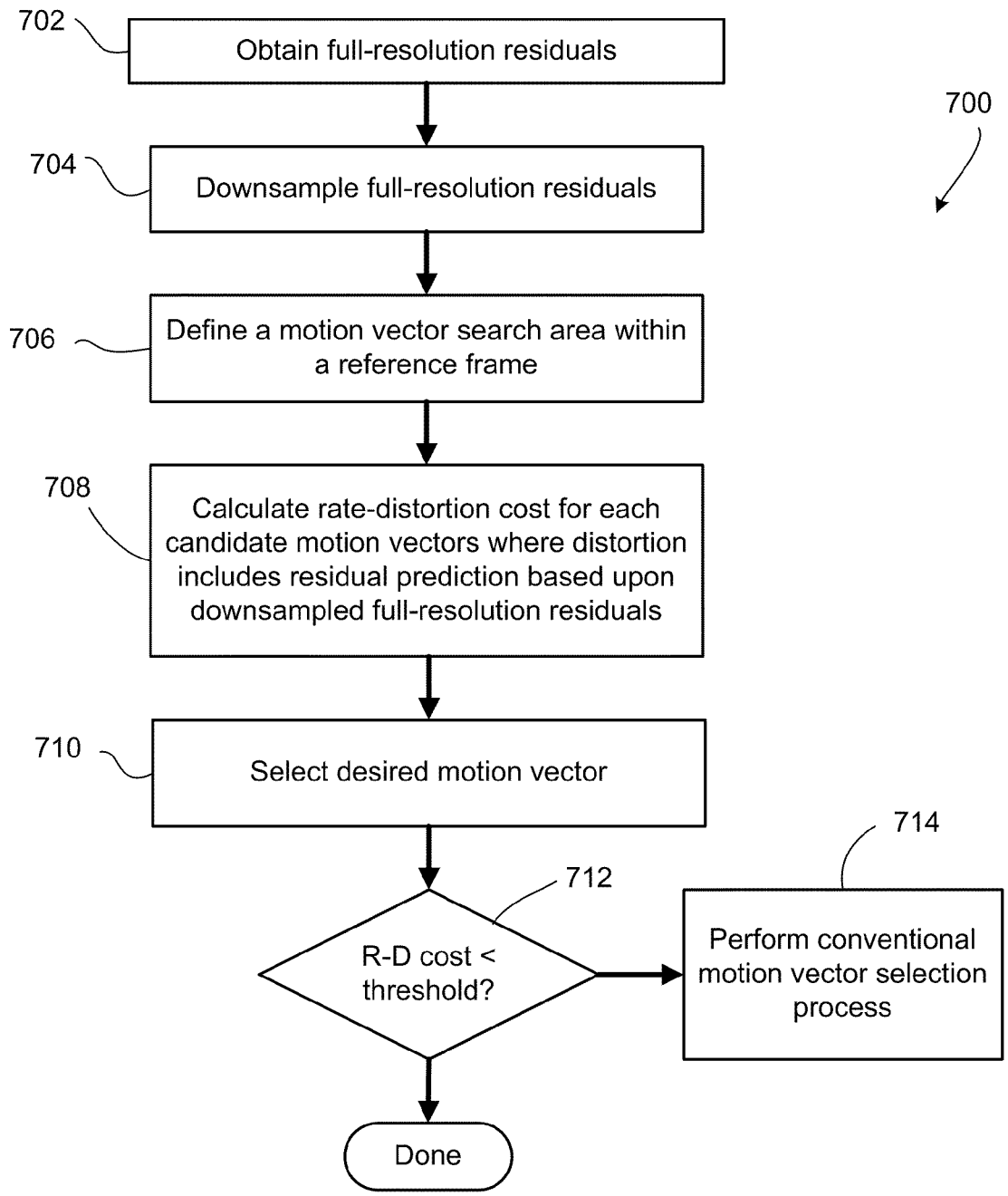
FIG. 20 shows, in flowchart form, an example method of encoding a downsampled video using predicted residuals in motion estimation.

Reference is now made to FIG. 20, which shows, in flowchart form, a method 700 of encoding a downsampled video. The method 700 may be implemented in a transcoder, for example. The method 700 includes decoding the full-resolution video to obtain full-resolution residuals for a given frame, as indicated by step 702. In step 704, the full-resolution residuals are downsampled. As noted previously, the downsampling may be performed in the pixel domain or the transform domain.

The method 700 then includes, for a particular partition in the downsampled video, defining a search area within a reference frame in step 706. The search area may be defined by making a motion vector prediction using, for example using the weighted averaging of Equation (5), and including a preset number of pixels in each direction around the prediction point. The search area may be defined by making multiple predictions and combining them into a unified search area, as described above. Any other process may be used to define a search area within the reference frame. The search area within the reference frame establishes range over which the encoder will evaluate candidate motion vectors.

In step 708, the encoder determines a rate-distortion cost for each candidate motion vector in the search area. The rate-distortion cost calculated in step 708 includes calculating distortion using the downsampled residuals. For example, the distortion term in the calculation may include determining a reconstruction of the partition based on the portion of the reference frame indicated by the candidate motion vector modified by the reconstruction of the predicted residuals. The reconstruction of the predicted residuals may include the transforming quantization, inverse quantization and inverse transforming of the downsampled full-resolution residuals. The downsampled full-resolution residuals used in the calculation are those residuals relating to a partition in the full-resolution video that corresponds to the partition in the downsampled video being evaluated/encoded.

In one embodiment, Equation (4) is used to determine the rate-distortion cost in step 708.

In step 710 the desired motion vector for the partition under evaluation is selected on the basis that it is the candidate motion vector having the lowest rate-distortion cost found in step 708.

The encoder may then determine, in step 712, whether the resulting rate-distortion cost for the candidate motion vector selected in step 710 as the desired motion vector is lower than a preset threshold value. If not, it may indicate that the predicted residuals are a poor prediction, and the full-resolution encoding parameters are not going to assist in this instance. Accordingly, if the rate-distortion cost is not less than the threshold value, then the encoder employs conventional motion vector selection process, as indicated in step 714. Otherwise, the desired motion vector is used for the partition being evaluated in the downsampled video, and the encoding process continues.

Figure 19:
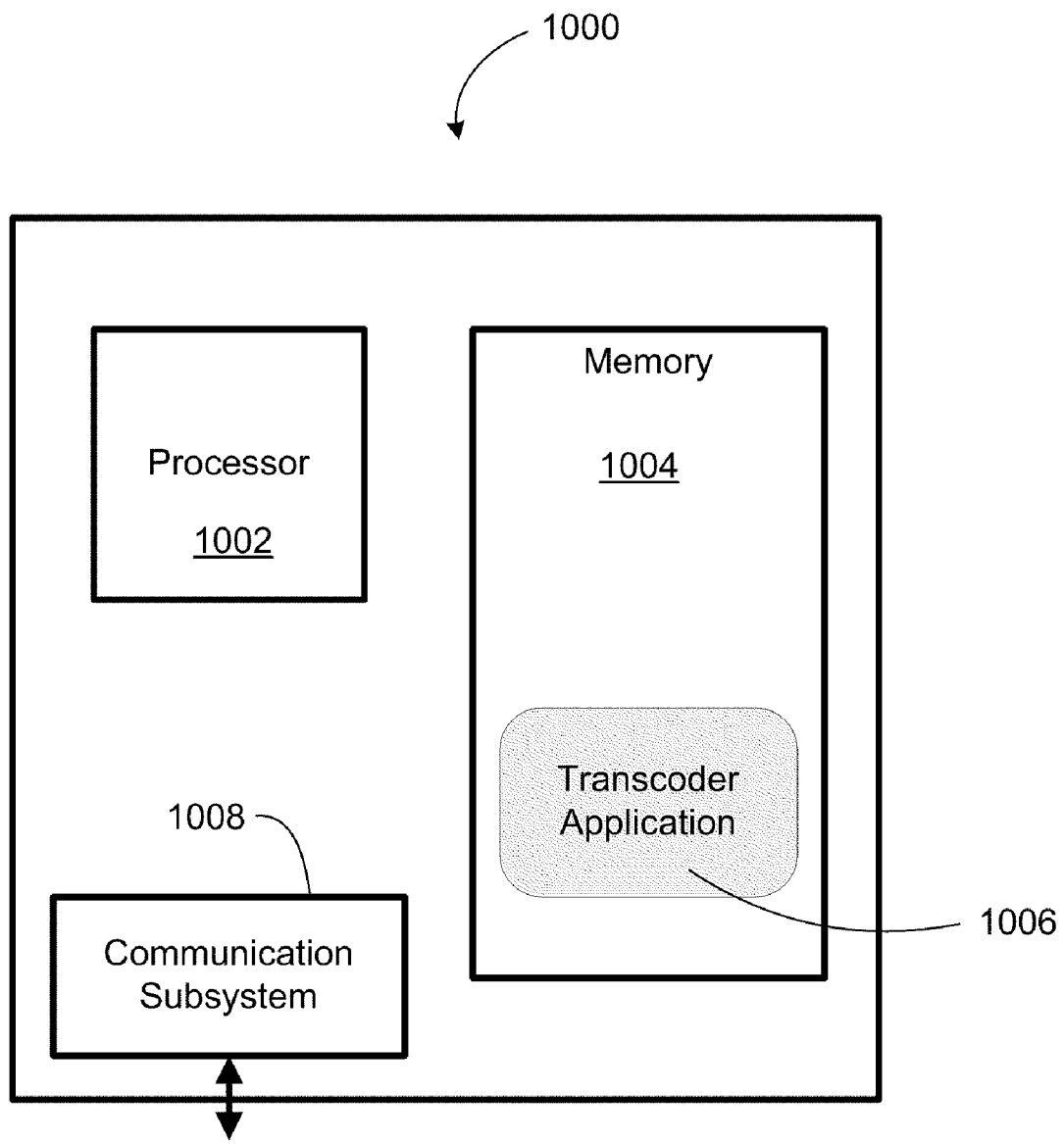
FIG. 19 shows, in block diagram form, an example embodiment of a transcoder.

Reference is now also made to FIG. 19, which shows a simplified block diagram of an example embodiment of a transcoder 1000. The transcoder 1000 includes a processor 1002, a memory 1004, and a transcoding application 1006. The transcoding application 1006 may include a computer program or application stored in memory 1004 and containing instructions for configuring the processor 1002 to perform steps or operations such as those described herein. For example, the transcoding application 1006 may include subcomponents or parts for implementing a decoder, a spatial downsampler, and an encoder. The decoder component configures the processor to decode encoded full-resolution video and output a pixel domain full-resolution video. The spatial downsampler configures the processor to perform pixel domain downsampling of a full-resolution video into a downsampled video in accordance with a downsampling ratio. The encoder component configures the processor to encode a downsampled pixel domain video to output an encoded downsampled video. The encoder component may be adapted to implement some or all of the methods and processes described herein to improve the speed, efficiency, and or rate-distortion cost of the encoding.

The transcoder 1000 may further include a communications subsystem 1008 for receiving encoded full-resolution video and for outputting encoded downsampled video. In some cases, the communications subsystem 1008 may include a port or other output for transmitting decoded pixel domain video, including an HDMI port or any other output port capable of transmitting pixel domain video. The communications subsystem 1008, in some embodiments, may enable communications with a network, such as the Internet.

It will be understood that the transcoding application 1006 and/or its subcomponents or parts may be stored in on a computer readable medium, such as a compact disc, flash memory device, random access memory, hard drive, etc.

It will be appreciated that the transcoder according to the present application may be implemented in a number of computing devices, including, without limitation, servers, suitably programmed general purpose computers, set-top television boxes, television broadcast equipment, and mobile devices. The decoder or encoder may be implemented by way of software containing instructions for configuring a processor to carry out the functions described herein. The software instructions may be stored on any suitable computer-readable memory, including CDs, RAM, ROM, Flash memory, etc.

It will be understood, that the transcoder described herein and the module, routine, process, thread, or other software component implementing the described method/process for configuring the transcoder and/or any of its subcomponents or parts may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

In one aspect, the present application discloses a first method of encoding a downsampled video. The downsampled video is a spatially downsampled version of a full-resolution video. The downsampled video includes a frame having a macroblock partitioned into at least one partition, one of the partitions corresponding to at least two full-resolution partitions in a corresponding frame of the full-resolution video, each of the at least two full-resolution partitions having an associated full-resolution motion vector relative to a reference frame. The method includes downscaling the associated full-resolution motion vectors; calculating a weighting factor for each of the downscaled full-resolution motion vectors, wherein each weighting factor is based upon transform domain residual coefficients associated with that full-resolution motion vector; determining a motion vector prediction as the average of the product of each of the downscaled full-resolution motion vectors with its weighting factor; selecting a desired motion vector for the one of the partitions from a search area within the reference frame around the point indicated by the motion vector prediction; and encoding the downsampled video to generate an encoded downsampled video, including the desired motion vector for the one of the partitions.

In a second aspect, the present application discloses a second method of encoding a downsampled video. The downsampled video is a spatially downsampled version of a full-resolution video, the downsampled video including a frame having a macroblock partitioned into at least one partition, wherein one of the partitions corresponds to at least two full-resolution partitions in a corresponding frame of the full-resolution video, each of the at least two full-resolution partitions having an associated full-resolution motion vector relative to a reference frame. The method includes downscaling the associated full-resolution motion vectors; identifying, for each of the downscaled motion vectors, a search area within the reference frame centered at the pixels indicated by each of the respective downscaled motion vectors; searching within the search areas for candidate motion vectors for the one of the partitions, including determining for each candidate motion vector a rate-distortion cost; selecting the candidate motion vector having the minimum rate-distortion cost as the desired motion vector for the one of the partitions; and encoding the downsampled video to generate an encoded downsampled video, including the desired motion vector for the one of the partitions.

In a third aspect, the present application discloses a third method of encoding a downsampled video, wherein the downsampled video is a spatially downsampled version of a full-resolution video, the downsampled video including a frame having a macroblock that corresponds to at least two full-resolution macroblocks in a corresponding frame of the full-resolution video, each of the at least two full-resolution macroblocks having an associated full-resolution coding mode that defines the partitioning of the respective full-resolution macroblocks. The method includes determining an initial partitioning of the macroblock based on downsampling of the full-resolution macroblocks subject to a minimum partition size, wherein the initial partitioning divides the macroblock into a plurality of partitions; and storing the initial partitioning in a quad-tree data structure wherein each of the plurality of partitions is a leaf node, each leaf node having a parent node, wherein the quad-tree data structure corresponds to the spatial relationships amongst the plurality of partitions. The method then includes, recursively, identifying possible mergers, wherein each possible merger comprises the combination of two or more leaf nodes to create a larger partition, and wherein the two or more leaf nodes in each combination have a common parent node, and determining whether the larger partition has a smaller rate-distortion cost than the cumulative rate-distortion cost of the two or more leaf nodes and, if so, merging the two or more leaf nodes to generate an updated partitioning with the larger partition as a new leaf node. The method further includes encoding the downsampled video to generate an encoded downsampled video, including encoding the macroblock using the updated partitioning, after determining that no further possible mergers are identifiable.

In a fourth aspect, the present application discloses a fourth method of encoding a downsampled video, wherein the downsampled video is a spatially downsampled version of a full-resolution video, the downsampled video including a frame having a macroblock partitioned into at least one partition, wherein one of the partitions corresponds to at least two partitions in a corresponding frame of the full-resolution video, each of the at least two partitions having an associated full-resolution motion vector and associated transform domain residuals. The method includes downsampling the associated transform domain residuals to produce downsampled residuals; searching for candidate motion vectors for the one of the partitions, including determining a rate-distortion cost for each candidate motion vector, wherein determining includes calculating distortion using the downsampled residuals; selecting the candidate motion vector having the minimum rate-distortion cost as the desired motion vector for the one of the partitions; and encoding the downsampled video to generate an encoded downsampled video, including the desired motion vector for the one of the partitions.

In a further aspect, the present application discloses an encoder for encoding a downsampled video, wherein the downsampled video is a spatially downsampled version of a full-resolution video, the downsampled video including a frame having a macroblock partitioned into at least one partition, one of the partitions corresponding to at least two full-resolution partitions in a corresponding frame of the full-resolution video, each of the at least two full-resolution partitions having an associated full-resolution motion vector relative to a reference frame. The encoder includes a processor; a memory; a communications system for outputting an encoded downsampled video; and an encoding application stored in memory and containing instructions for configuring the processor to encode the downsampled video in accordance with any one of the methods described above.

In yet another aspect, the present application discloses a transcoder. The transcoder includes a decoder, a spatial downsampler configured to spatially downsample the full-resolution video in the pixel domain to produce the downsampled video, and any one of the encoders described above.

In yet a further aspect, the present application discloses a computer-readable medium having stored thereon computer-executable instructions which, when executed by a processor, configure the processor to execute any one or more of the methods described above.

Certain adaptations and modifications of the described embodiments can be made. Therefore, the above discussed embodiments are considered to be illustrative and not restrictive.

What is claimed is:

1. A method of encoding a downsampled video, wherein the downsampled video is a spatially downsampled version of a full-resolution video, the downsampled video including a frame having a macroblock partitioned into at least one partition, one partition of the at least one partition corresponding to at least two full-resolution partitions in a corresponding frame of the full-resolution video, each of the at least two full-resolution partitions having an associated full-resolution motion vector relative to a reference frame, the method comprising:

downscaling the associated full-resolution motion vectors;
calculating a weighting factor for each of the downscaled full-resolution motion vectors, wherein each weighting factor is based upon transform domain residual coefficients associated with that full-resolution motion vector;
determining a motion vector prediction as the average of the product of each of the downscaled full-resolution motion vectors with its respective weighting factor;
selecting a desired motion vector for said one partition from a search area within the reference frame, the search area being centered at a point indicated by the motion vector prediction; and
encoding the downsampled video to generate an encoded downsampled video, including the desired motion vector for said one partition, wherein there are k full-resolution partitions, and for each $i^{th}$ downscaled full-resolution motion vector said calculating comprises calculating the corresponding weighting factor $w_i$ in accordance with the expression:

$$w_i = \frac{\|DC_i\| + \sum_{\forall j \in TCOEFs\_AC} \|AC_{i,j}\|}{\sum_{\forall m \in k} \left(\|DC_m\| + \sum_{\forall j \in TCOEFs\_AC} \|AC_{m,j}\|\right)}$$

wherein $DC_i$ is the DC transform domain residual coefficient of the $i^{th}$ full-resolution partition, and $AC_{i,j}$ is the $j^{th}$ AC transform domain residual coefficient of the $i^{th}$ full-resolution partition, j being an index from 1 to the number of transform domain residual AC coefficients associated with the $i^{th}$ full-resolution partition, and m being an index from 1 to k.

2. The method claimed in claim 1, wherein, for each downscaled full-resolution motion vector, its weighting factor is based upon the magnitude of transform domain residual coefficients associated with that downscaled full-resolution motion vector relative to the magnitude of transform domain residual coefficients associated with the other downscaled full-resolution motion vectors associated with the at least two full-resolution partitions.

3. The method claimed in claim 2, wherein a first downscaled full-resolution motion vector has larger magnitude transform domain residual coefficients associated with it than the transform domain residual coefficients associated with a second downscaled full-resolution motion vector, and wherein said calculating includes calculating a first weighting factor for the first downscaled full-resolution motion vector that is larger than a second weighting factor for the second downscaled full-resolution motion vector.

4. The method claimed in claim 2, wherein a first downscaled full-resolution motion vector has larger magnitude transform domain residual coefficients associated with it than the transform domain residual coefficients associated with a second downscaled full-resolution motion vector, and wherein said calculating includes calculating a first weighting factor for the first downscaled full-resolution motion vector that is smaller than a second weighting factor for the second downscaled full-resolution motion vector.

5. A method of encoding a downsampled video, wherein the downsampled video is a spatially downsampled version of a full-resolution video, the downsampled video including a frame having a macroblock partitioned into at least one partition, one partition of the at least one partition corresponding to at least two full-resolution partitions in a corresponding frame of the full-resolution video, each of the at least two full-resolution partitions having an associated full-resolution motion vector relative to a reference frame, the method comprising:

downscaling the associated full-resolution motion vectors;
calculating a weighting factor for each of the downscaled full-resolution motion vectors, wherein each weighting factor is based upon transform domain residual coefficients associated with that full-resolution motion vector;
determining a motion vector prediction as the average of the product of each of the downscaled full-resolution motion vectors with its respective weighting factor;
selecting a desired motion vector for said one partition from a search area within the reference frame, the search area being centered at a point indicated by the motion vector prediction; and encoding the downsampled video to generate an encoded downsampled video, including the desired motion vector for said one partition, wherein there are k full-resolution partitions, and for each $i^{th}$ downscaled full-resolution motion vector said calculating comprises calculating the corresponding weighting factor $w_i$ in accordance with the expression:

$$w_i = \frac{e^{-\left(\|DC_i\| + \sum_{\forall j \in TCOEFe\_AC} \|AC_{i,j}\|\right)}}{\sum_{\forall m \in k} \left(e^{-\left(\|DC_m\| + \sum_{\forall j \in TCOEFa\_AC} \|AC_{m,j}\|\right)}\right)}$$

wherein $DC_i$ is the DC transform domain residual coefficient of the $i^{th}$ full-resolution partition, and $AC_{i,j}$ is the $j^{th}$ AC transform domain residual coefficient of the $i^{th}$ full-resolution partition, j being an index from 1 to the number of transform domain residual AC coefficients associated with the $i^{th}$ full-resolution partition, and m being an index from 1 to k.

6. The method claimed in claim 1, wherein the spatially downsampled video has been downsampled by a downsampling ratio, and wherein the downscaling comprises downscaling by the downsampling ratio.

7. The method claimed in claim 1, wherein said selecting includes searching the search area for candidate motion vectors and selecting as the desired motion vector the candidate motion vector that minimizes a rate-distortion cost expression.

8. The method claimed in claim 1, further including:
decoding a full-resolution encoded video to produce the full-resolution video, including decoding the at least two full-resolution partitions and their associated full-resolution motion vectors; and
spatially downsampling the full-resolution video in the pixel domain to produce the downsampled video.

9. An encoder for encoding a downsampled video, wherein the downsampled video is a spatially downsampled version of a full-resolution video, the downsampled video including a frame having a macroblock partitioned into at least one partition, one partition of the at least one partition corresponding to at least two full-resolution partitions in a corresponding frame of the full-resolution video, each of the at least two full-resolution partitions having an associated full-resolution motion vector relative to a reference frame, the encoder comprising:

a processor;
a memory;
a communications system for outputting an encoded downsampled video; and
an encoding application stored in memory and containing instructions for configuring the processor to encode the downsampled video by performing the method claimed in claim 1.

10. The encoder claimed in claim 9, wherein, for each downscaled full-resolution motion vector, its weighting factor is based upon the magnitude of transform domain residual coefficients associated with that downscaled full-resolution motion vector relative to the magnitude of transform domain residual coefficients associated with the other downscaled full-resolution motion vectors associated with the at least two full-resolution partitions.

11. The encoder claimed in claim 10, wherein a first downscaled full-resolution motion vector has larger magnitude transform domain residual coefficients associated with it than the transform domain residual coefficients associated with a second downscaled full-resolution motion vector, and wherein the encoding application configures the processor to calculate a first weighting factor for the first downscaled full-resolution motion vector that is larger than a second weighting factor for the second downscaled full-resolution motion vector.

12. The encoder claimed in claim 10, wherein a first downscaled full-resolution motion vector has larger magnitude transform domain residual coefficients associated with it than the transform domain residual coefficients associated with a second downscaled full-resolution motion vector, and wherein the encoding application configures the processor to calculate a first weighting factor for the first downscaled full-resolution motion vector that is smaller than a second weighting factor for the second downscaled full-resolution motion vector.

13. The encoder claimed in claim 9, wherein the spatially downsampled video has been downsampled by a downsampling ratio, and wherein the encoding application configures the processor to downsample the associated full-resolution motion vectors by the downsampling ratio.

14. The encoder claimed in claim 9, wherein the encoding application configures the processor to select the desired motion vector by searching the search area for candidate motion vectors and selecting as the desired motion vector the candidate motion vector that minimizes a rate-distortion cost expression.

15. A transcoder, comprising:
  a decoder configured to decode a full-resolution encoded video to produce the full-resolution video, including decoding the at least two full-resolution partitions and their associated full-resolution motion vectors;
  a spatial downsampler configured to spatially downsample the full-resolution video in the pixel domain to produce the downsampled video; and
  the encoder claimed in claim 9.

16. A computer-readable medium having stored thereon computer-executable instructions which, when executed by a processor, configure the processor to execute the method claimed in claim 1.

17. An encoder for encoding a downsampled video, wherein the downsampled video is a spatially downsampled version of a full-resolution video, the downsampled video including a frame having a macroblock partitioned into at least one partition, one partition of the at least one partition corresponding to at least two full-resolution partitions in a corresponding frame of the full-resolution video, each of the at least two full-resolution partitions having an associated full-resolution motion vector relative to a reference frame, the encoder comprising:
  a processor;
  a memory;
  a communications system for outputting an encoded downsampled video; and
  an encoding application stored in memory and containing instructions for configuring the processor to encode the downsampled video by performing the method claimed in claim 5.

18. A computer-readable medium having stored thereon computer-executable instructions which, when executed by a processor, configure the processor to execute the method claimed in claim 5.

* * * * *